US008892232B2

(12) United States Patent
Suhami

(10) Patent No.: US 8,892,232 B2
(45) Date of Patent: Nov. 18, 2014

(54) SOCIAL NETWORK WITH ENHANCED AUDIO COMMUNICATIONS FOR THE HEARING IMPAIRED

(71) Applicant: Suhami Associates Ltd, Petah Tikva (IL)

(72) Inventor: Avraham Suhami, Petah Tikva (IL)

( * ) Notice: Subject to any disclaimer, the term of this patent is extended or adjusted under 35 U.S.C. 154(b) by 0 days.

(21) Appl. No.: 13/682,352

(22) Filed: Nov. 20, 2012

(65) Prior Publication Data

US 2013/0339025 A1    Dec. 19, 2013

Related U.S. Application Data

(63) Continuation of application No. 13/495,648, filed on Jun. 13, 2012, which is a continuation-in-part of application No. 13/430,728, filed on Mar. 27, 2012, now Pat. No. 8,543,061.

(60) Provisional application No. 61/482,000, filed on May 3, 2011.

(51) Int. Cl.

| G06F 17/00 | (2006.01) |
|---|---|
| G10L 21/00 | (2013.01) |
| G10L 21/06 | (2013.01) |
| G10L 25/00 | (2013.01) |
| H04M 1/00 | (2006.01) |
| H04M 9/00 | (2006.01) |
| H04R 25/00 | (2006.01) |
| G10L 21/02 | (2013.01) |
| G10L 21/003 | (2013.01) |
| H04M 3/56 | (2006.01) |
| G10L 21/013 | (2013.01) |

(52) U.S. Cl.
CPC ............ *H04R 25/00* (2013.01); *G10L 21/0205* (2013.01); *G10L 2021/0135* (2013.01); *G10L 2021/065* (2013.01); *G10L 21/003* (2013.01); *H04M 3/569* (2013.01)
USPC ........ 700/94; 704/207; 704/271; 379/390.02; 381/320

(58) Field of Classification Search
CPC ... G10L 21/00; G10L 21/003; G10L 21/0205; G10L 25/18; G10L 2021/0135; G10L 2021/065; H04M 3/569
USPC .................... 700/94; 704/207, 223, 228, 271; 379/52, 88.01, 88.19, 93.26, 142.06, 379/390.02
See application file for complete search history.

(56) References Cited

U.S. PATENT DOCUMENTS

| 6,792,401 | B1 | 9/2004 | Nigro et al. |
|---|---|---|---|
| 6,912,289 | B2 | 6/2005 | Vonlanthen et al. |
| 7,103,192 | B2 | 9/2006 | Bailey |
| 7,222,091 | B2 | 5/2007 | Yoshida |
| 7,255,437 | B2 | 8/2007 | Howell et al. |
| 7,272,255 | B2 | 9/2007 | Ishiyama |
| 7,283,636 | B2 | 10/2007 | Nishimura et al. |
| 7,912,239 | B2 | 3/2011 | Nishimura et al. |
| 8,109,629 | B2 | 2/2012 | Howell et al. |
| 8,111,848 | B2 | 2/2012 | Roeck et al. |
| 8,195,460 | B2 * | 6/2012 | Degani et al. ................. 704/243 |
| 8,589,166 | B2 * | 11/2013 | Zopf ............................. 704/262 |
| 2004/0122664 | A1 | 6/2004 | Lorenzo et al. |
| 2008/0267427 | A1 | 10/2008 | Johnston |

(Continued)

*Primary Examiner* — Jesse Elbin

(57) ABSTRACT

The invention describes the proprietary activities, services and devices provided to a networked community of Hearing impaired people, that help improve wired, wireless and direct voice communications.

11 Claims, 16 Drawing Sheets

(56) References Cited

U.S. PATENT DOCUMENTS

| | | |
|---|---|---|
| 2010/0074460 A1 | 3/2010 | Marzetta |
| 2010/0158292 A1 | 6/2010 | Pedersen |
| 2010/0332283 A1 | 12/2010 | Ng et al. |
| 2011/0033071 A1 | 2/2011 | Larsen |
| 2011/0060244 A1 | 3/2011 | Givens et al. |
| 2011/0136537 A1 | 6/2011 | Marterer |
| 2011/0268099 A1 | 11/2011 | Argyriou et al. |
| 2012/0183164 A1 | 7/2012 | Foo et al. |
| 2012/0183165 A1 | 7/2012 | Foo et al. |
| 2012/0189140 A1 | 7/2012 | Hughes |
| 2012/0215532 A1 | 8/2012 | Foo |
| 2012/0250916 A1 | 10/2012 | Hain |
| 2013/0030800 A1* | 1/2013 | Tracey et al. .............. 704/219 |
| 2013/0275126 A1* | 10/2013 | Lee .............................. 704/205 |
| 2013/0339007 A1* | 12/2013 | Lyle et al. .................. 704/201 |

\* cited by examiner

Fig. 11
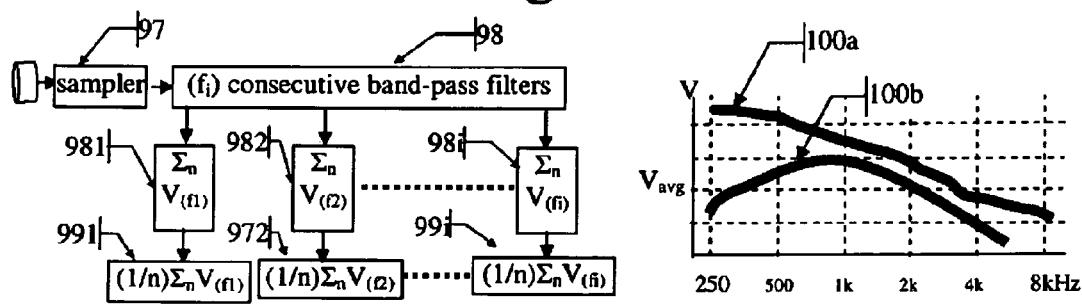
Fig. 12
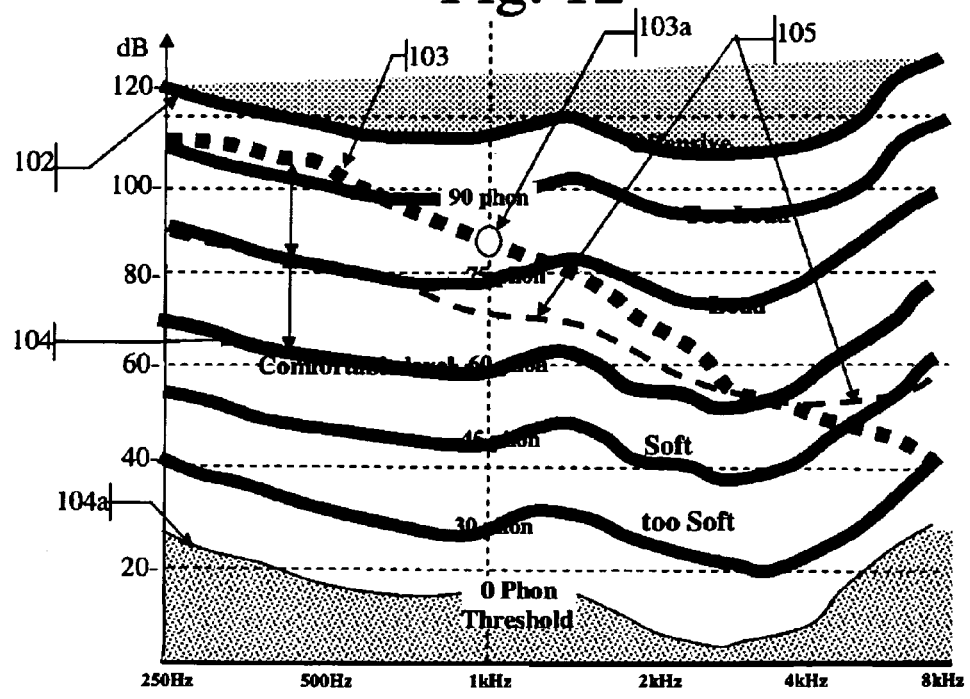
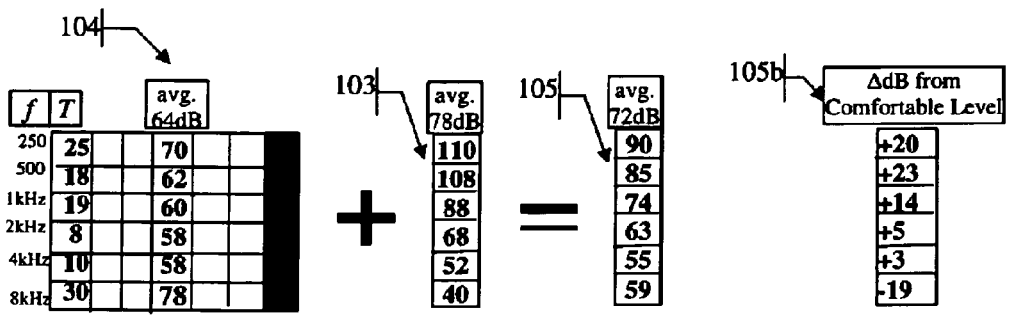

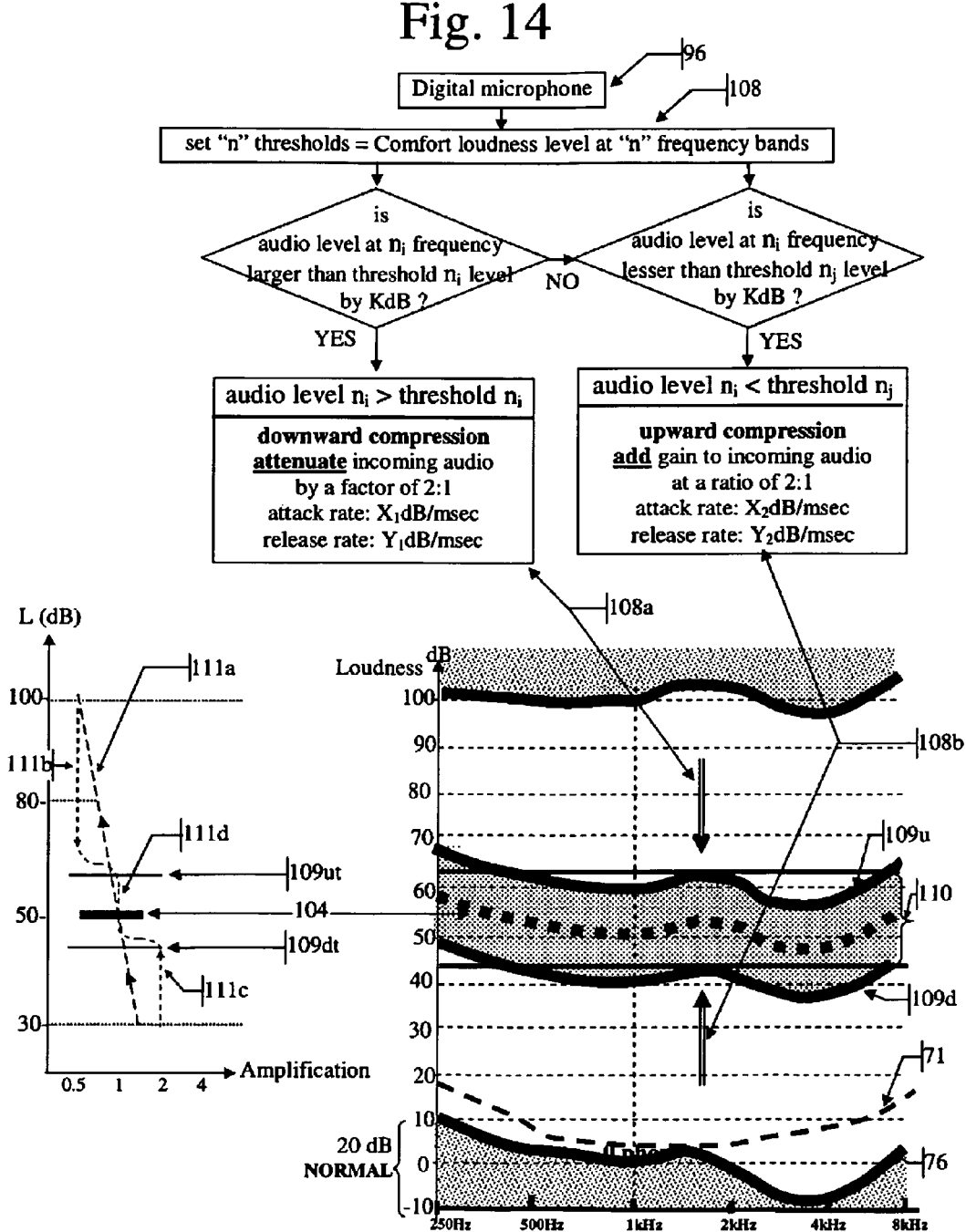

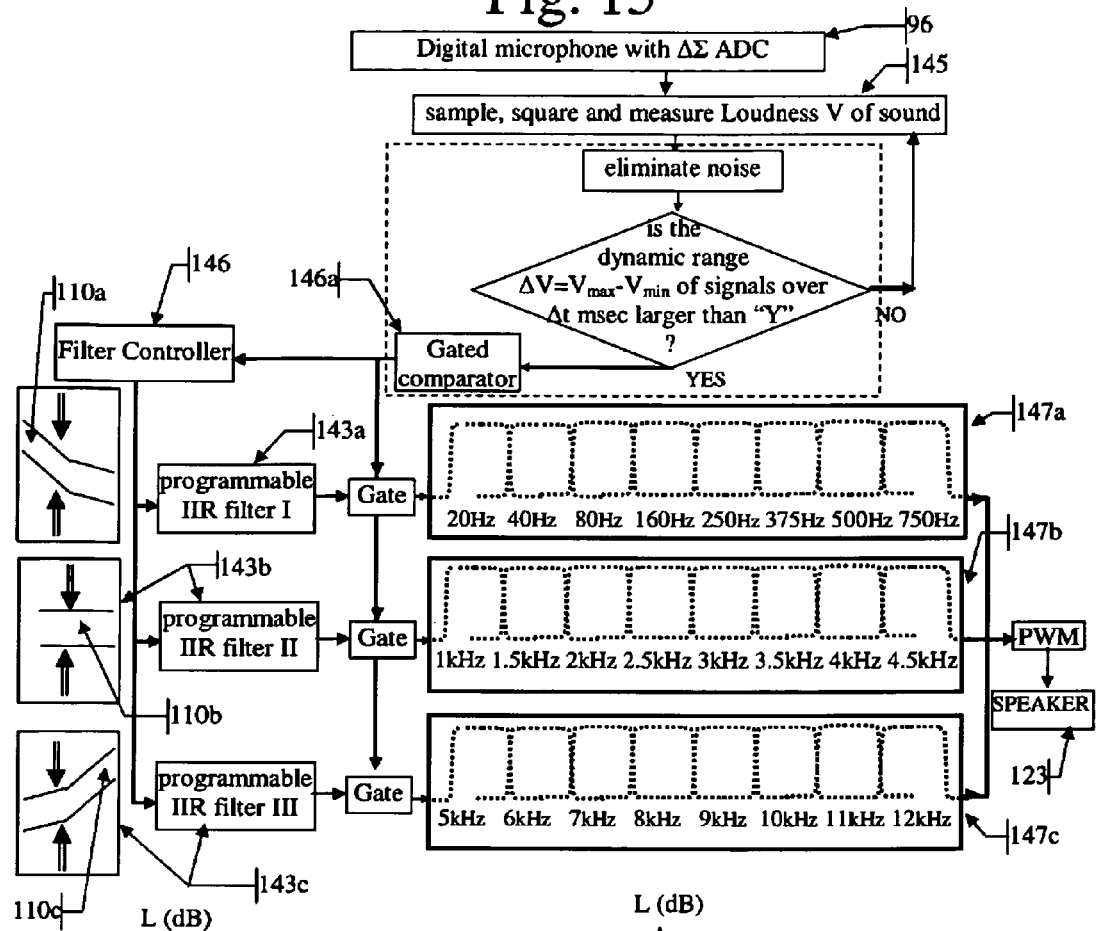
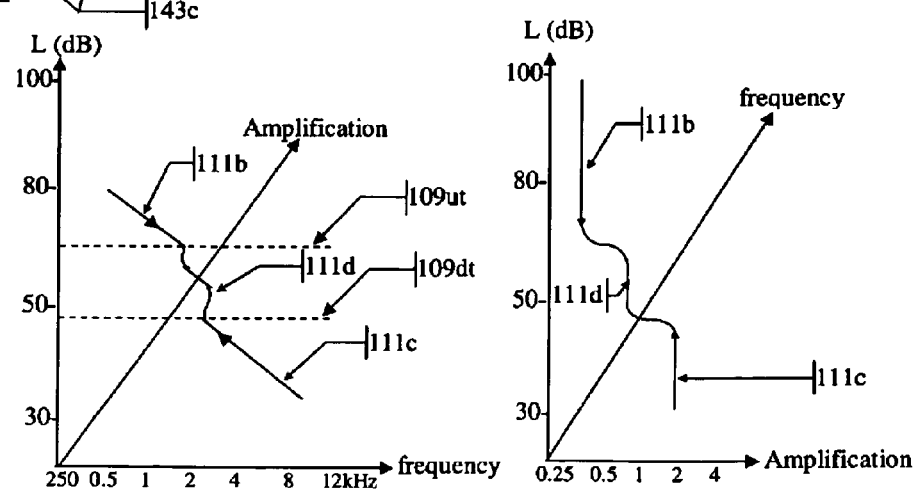
Fig. 15

Fig. 16

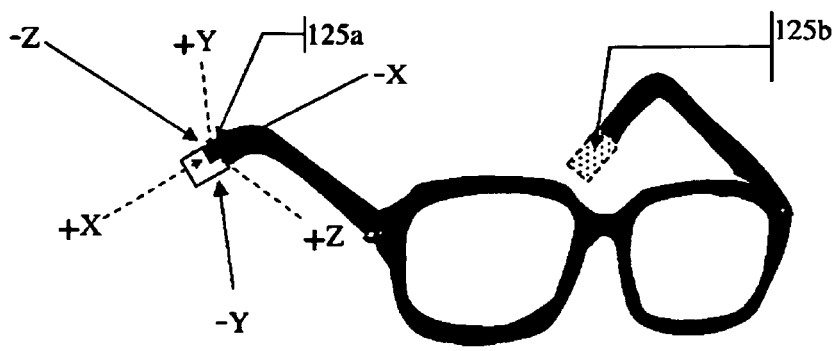

| | TABLE 2 | |
|---|---|---|
| from BACK | single_TAP | activate speaker |
| X | Double_TAP | shut speaker |
| from TOP | single_TAP | increase volume |
| Y | Double_TAPS | decrease volume |
| from the SIDE | single_TAP | activate BlueTooth |
| Z | Double_TAP | shut Bluetooth |

| | TABLE 3 | |
|---|---|---|
| from FRONT | 1-TAP | activate Equalizer |
| -X | 2-TAPs | shut Equalizer |
| from UNDER | 2-TAPs | amplification first digit |
| -Y | 1-TAPs | amplification $2^{nd}$ digit |
| from DOWN | 1-TAP | |
| -Z | 2-TAPs | |

Fig.18
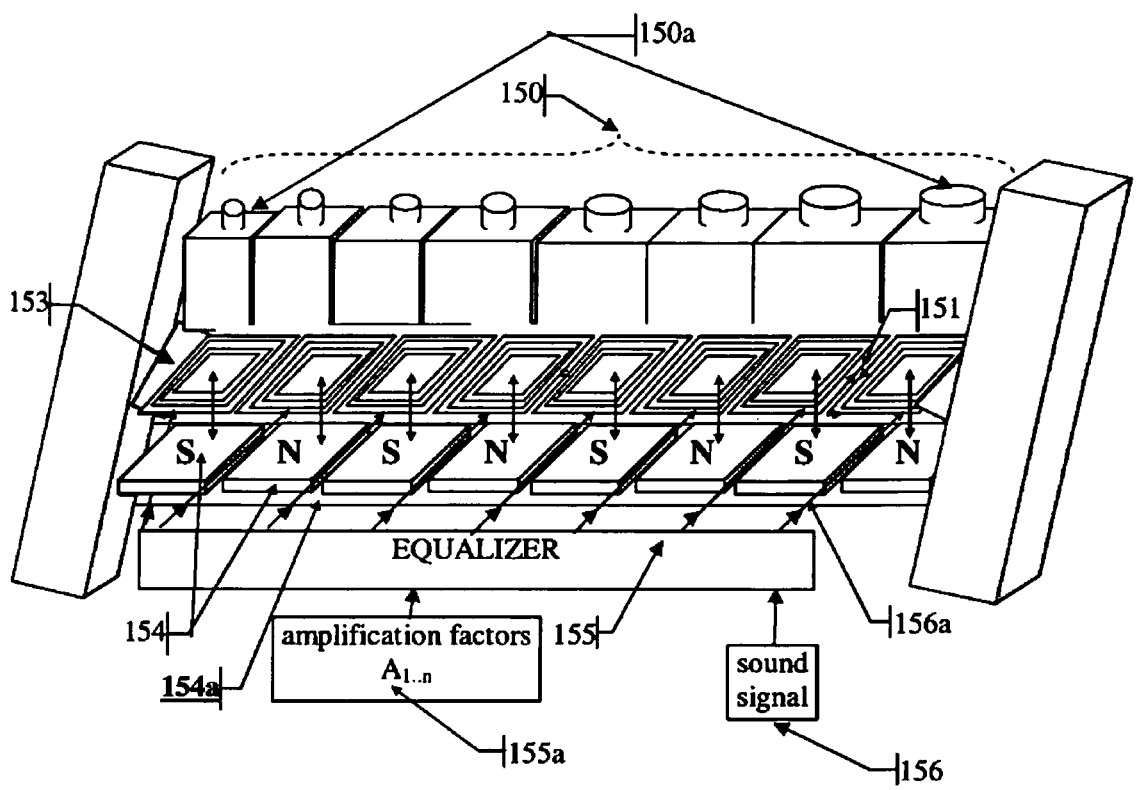
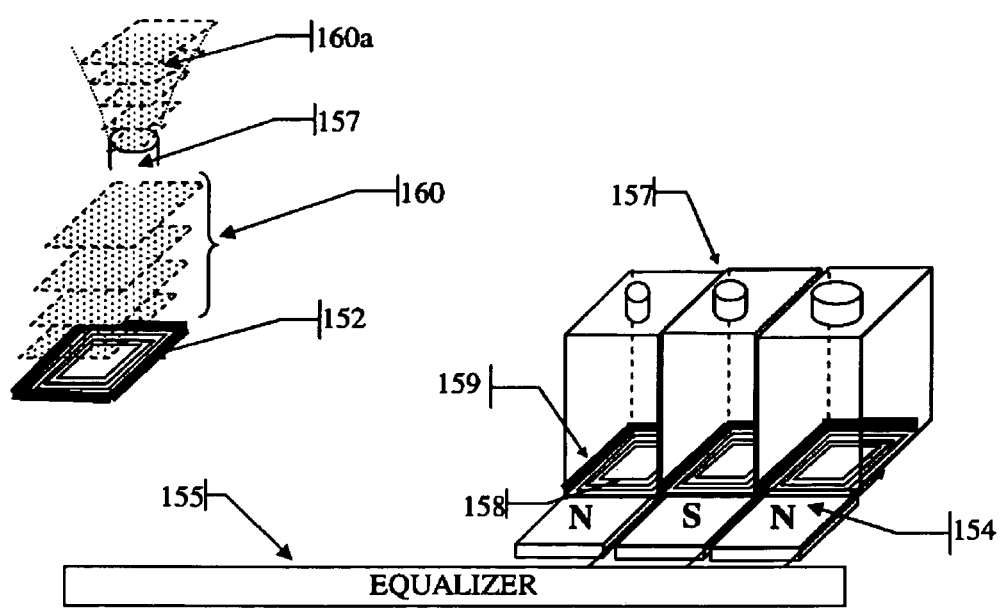

SOCIAL NETWORK WITH ENHANCED AUDIO COMMUNICATIONS FOR THE HEARING IMPAIRED

REFERENCE TO RELATED APPLICATIONS

This application is a continuation-in-part of U.S. patent application Ser. No. 13/495,648 titled "Audio Communication networks filed on 13 Jun. 2012, which is a continuation-in-part of U.S. patent application Ser. No. 13/430,728 titled "Cellphone managed Hearing Eyeglasses" filed on 27 Mar. 2012 which claims benefit of U.S. Provisional application 61/482,000 titled "Remote Managed Hearing Eyeglasses" filed on 3 May 2011, incorporated herein in their entirety by reference.

FIELD OF THE INVENTION

This invention relates to social networks using Audio communication services

BACKGROUND OF THE INVENTION

Many of our experiences and enjoyments in life are audio related. However both audio and visual capabilities of Humans deteriorate with age, reducing our capabilities for oral communication and audio related enjoyments. Degrees of audio impairment go from mild to severe with advanced age. The route to improvement, at whatever stage one may be, starts from assessment of the causes and degrees of the problem and deciding what to do, to improve the conditions and performances. Although going to a doctor and buying hearing aids is an essential part of the solution, exchanging information with friends and people in the same situation as time goes by, is a necessary complementary tool.

The degree of degradation of audio faculties can be self assessed, using tests available on the Internet. However people are reticent to recognize the decline in their hearing capabilities and do not take steps to remedy their situation. Going to a doctor is often delayed indefinitely until the hearing impairment becomes critical. A network of friends and acquaintances that have common interests in general, may gently provide guidance and support in the audio related areas, too.

The website of the proposed social network will provide the necessary "tools", forums and access to services and devices that improve audio communications to the Hearing impaired.

BRIEF SUMMARY OF THE INVENTION

The Social Network, subject of the invention, will offer its members advanced voice communications adapted to their Hearing profiles and to the Voice profile of their callers, that together improve the intelligibility of both wireless and line telephony calls. The wideband codecs complying to the ITU G.722 standards extending speech transmissions beyond the toll quality from 300 Hz-to-3400 hz to 50 Hz-to-7 kHz will enable superior voice quality in all telephony applications; therefore all audio and hearing aid applications will have to be updated. People considered so far to have "normal" hearing will start noticing their hearing impairment.

In addition to providing the Hearing and Caller Speech corrected voice communication, the network will also provide speech-to-text translation during video calls and enable callers to initiate the speech-to-text translation at their side, enabling the called party to hear the hearing corrected speech and read its textual translation, simultaneously.

The social network will have an Internet website accessible to the general public, where the services available to its members will be listed and explained.

The Social Network will be structured as a cluster of specific "Spheres-of-Interest", addressing the background information needed for using the advanced audio communications offered to its members. The basic "Spheres-of-Interest" are general knowledge related; they explain both the basics and the recent advances in the Audio field in order to better understand the required Tests that determine the Hearing profile of a person and enable to diligently use the features and advantages of the offered voice communications and related devices.

The self administered Tests may be taken alone, or in the presence of one or more members of the "Sphere of Interest" that may help and contribute remarks. To this end, the Social Network site will provide video-conferencing services 12, enabling members of the network to offer help and remarks during the automated tests.

Test results are fed to a Data-base of Computerized Medical Diagnosis that given the member's profile, offers several possible diagnoses with related probabilities. The Computerized system may also suggest additional Tests to be taken, in a clinic or a lab; they may also comprise consultation with independent Experts, that are usually fee-based or with experts of related commercial companies that may be charge-free.

Based on the Computerized Medical Diagnosis and consultations with Experts, members may use "Hearing Training" courses that improve and sharpen their hearing senses.

Commercial "Spheres-of-Interest" offer the communication and audio devices needed for the advanced communication service offered. Available "Hearing Aids" are compared and reviewed. Several members may jointly browse the offered devices and access members that formerly acquired the same devices and learn from their experiences.

The video-conferencing services offered in the website will enable several members to participate in common-interest virtual activities, together, simultaneously.

As the aesthetics of the devices offered for sale are of prime importance, the site will enable, "virtual fitting" of the hearing aids, showing the selected device in 3D, on the body of the person, "wearing" it. The Social Network will also negotiate group rates for purchasing services and devices at advantageous prices. The website will also offer proprietary items such as Fashion Optical and Sun Eyeglasses as well as Jewelry with embedded Hearing aids, cellular phones and wireless transceivers, adapted to the requirements of the advanced voice communications offered for the Hearing impaired. The website will also host "Do-it-yourself" simple repair services and special tools and diagrams for carrying out the simple tuning of Hearing Aids.

The invention comprises new ways of correcting the Hearing loss and distributed Hearing aids that operating together in sync, implement these advances. Such advanced devices include Hearing eyeglasses, earphones, cellular phone/tablets, PSTN phones and stand-alone modules connected by wireless transceivers in a piconet network of short range transceivers. The invention also includes description of advanced components such as wideband receivers that expand the range of generated sounds.

LIST OF FIGURES

FIG. 11 illustrates the use of digital filters of an equalizer for measuring the Voice Intonation and Long Term Average Speech Spectra of callers.

FIG. 12 illustrates an algorithm for Hearing correction by modifying the optimal hearing loudness of a hearing impaired person, by taking in account the Voice Intonation Loudness in the frequency domain of the caller.

FIG. 14 illustrates another method for modification of the optimal hearing loudness of a hearing impaired person by taking in account the Voice Intonation loudness in the frequency domain of the caller.

FIG. 15 illustrates the use of several equalizers at different frequency bands, preceded by appropriate digital IIR filters, to implement the method for modification of the optimal hearing loudness of a hearing impaired person described in FIG. 14.

FIG. 16 illustrates the use of a 3D accelerometer as a "Tap" sensor for selecting various functions of a Hearing Aid.

FIG. 18 illustrates a flat speaker, where different portions of the diaphragm vibrate at different frequencies and where the sound waves generated by said vibrations are amplified by resonant Helmholz cells.

DETAILED DESCRIPTION OF THE INVENTION

Figure 1:
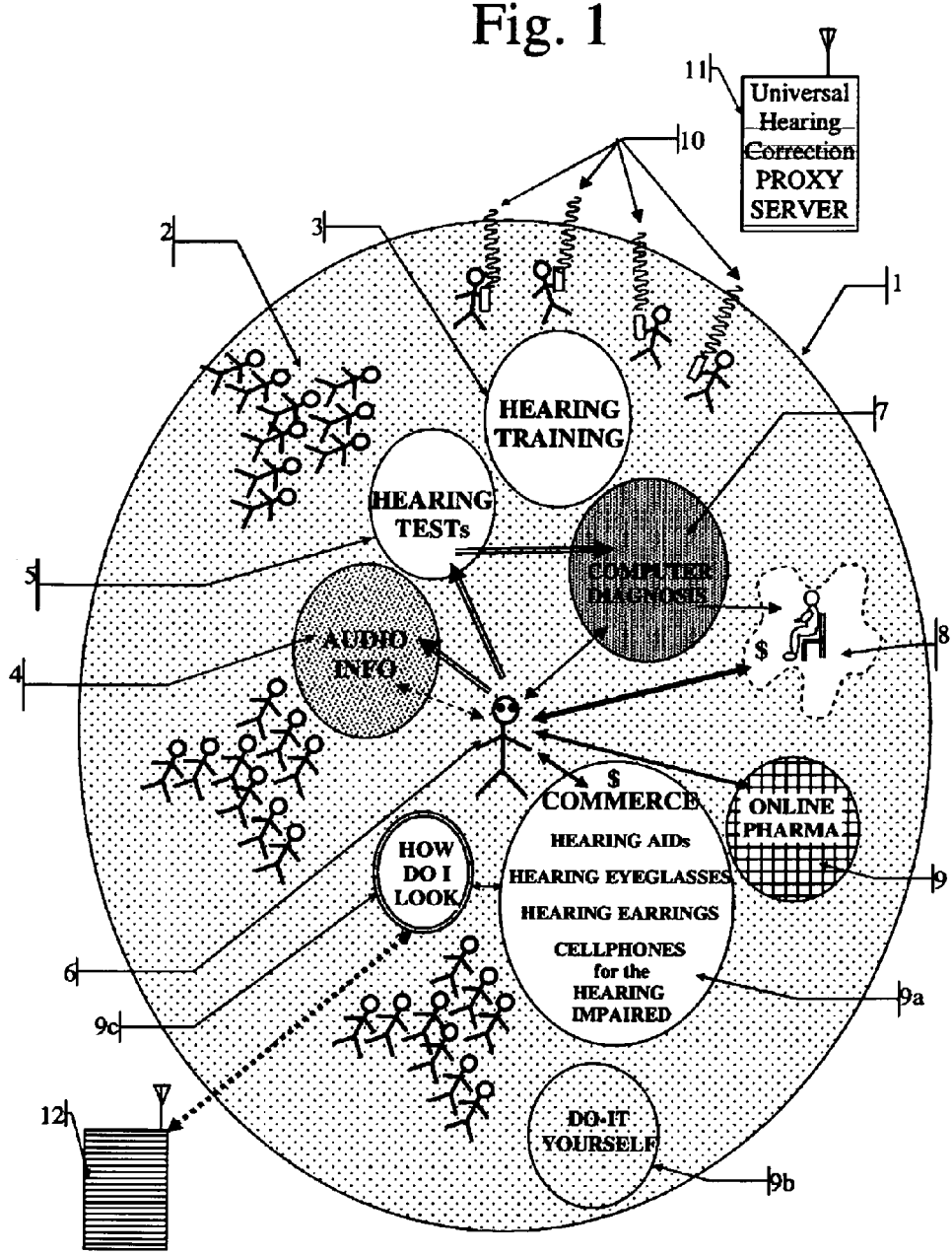
FIG. 1 illustrates the structure of the Social Network for sharing communications and Audio services and the various "Spheres-of-Interest" its members may access.

The Social Network of the invention is a community for people interested in improved Voice communications adapted to their Hearing profiles and wish to address specific personal impediments in this area As illustrated in FIG. 1, contacts between the members 6 and access to the various services offered are carried through an Internet website 1 that comprises specific "Spheres-of-Interest" and tools that enhance the benefits gained by visiting them. While access to the Internet site of the social network will be free and accessible to all, access to some Spheres-of-Interest will require membership and pre-registration.

The basic service of improved Voice Communications 10 personally adapted to the Hearing profile of the member and his characteristic Voice Intonation, will be provided by a Hearing Correction Proxy Server 11 and requires a monthly subscription fee or a one-time charge per call.

The basic "Spheres-of-Interest" are "general knowledge" related; they explain both the basics and the recent advances in the Hearing and Audiology 4 fields. Members may define sub-spheres-of-interest in the Audio field and contribute material to them, for the benefit of other members.

Self-administered "Tests" 5 will be offered in a "Sphere of Interest" in the Audio area. One such test is the determination and charting of the personal Comfortable levels of Hearing of speech directly through air, using a cellular phone directly or through earphones. Another Test is the Verbal Acuity testing that measures intelligibility of certain phonemes, syllables and words and the capability of the brain to decipher words in spite of missing frequencies. Specific Tests for children conducted by or in presence of their parents is one of the tests that should be applied at a very early age, in order to detect hearing deficiencies as soon as possible.

The Tests may be taken alone, or in the presence of several members 2 of the said "Sphere of Interest" that may help and contribute remarks. The Social Network site will provide video-conferencing services 12 enabling to several members to participate in common interest activities together, simultaneously.

Test results may be fed to a Data-base of Computerized Medical Diagnosis service 7, that given the symptoms entered and the results of the test, will offer several diagnoses with related probabilities, based on the member's declared profile. Prescriptions may be filled through an online Pharma 9 service. The Computerized system may also suggest additional Tests that may be taken outside, in a clinic or a lab. Advanced "Spheres-of-Interest" comprise consultation with independent Experts 8, that are usually fee-based, or with experts of related companies that may be charge-free.

Based on the Computerized Medical Diagnosis and consultations with Experts, members may attend Hearing Training 3 sessions that use proprietary technologies and exercises that improve intelligibility of messages. For example one may be trained to use "Lip reading" and correlate the face expressions 185 and the relative movements between the lips, the teeth and the tongue of the talker, on a video display, with the related phonemes and thus improve to "make out" the audio message.

Members may browse in "Spheres-of-Interest" of Audio Devices 9a and compare available "Hearing Aids", earphones, speakers and related Accessories. They may be joined in their browsing experience with other members of their specific "Sphere of Interest" and benefit from their remarks, using the video-conferencing service.

As the aesthetics of said goods are of prime importance, the site will enable displaying the selected device in 3D, superimposed on the body of the person viewing it 9c using a proprietary "virtual fitting" service.

The Social Network will also negotiate group rates for purchasing services and devices, thus offering advantageous prices to its members. It will host "Do-it-yourself" services 9b for Hearing Aids of different brands for tuning the devices from time-to-time without visiting a clinic. Members will also be able to buy tools and parts needed for small repairs. This "Sphere of Interest" will also host 3D printing services, thus enabling members of the network to order self designed accessories for their Hearing aids and other packaging options that may hold the basic Hearing aid. The 3D printing service will also supply suitable software for designing 3D gadgets related to Hearing devices, starting from a rough sketch.

The Social Network will also offer its members proprietary Devices and Services that enhance Hearing in various circumstances.

Figure 2:
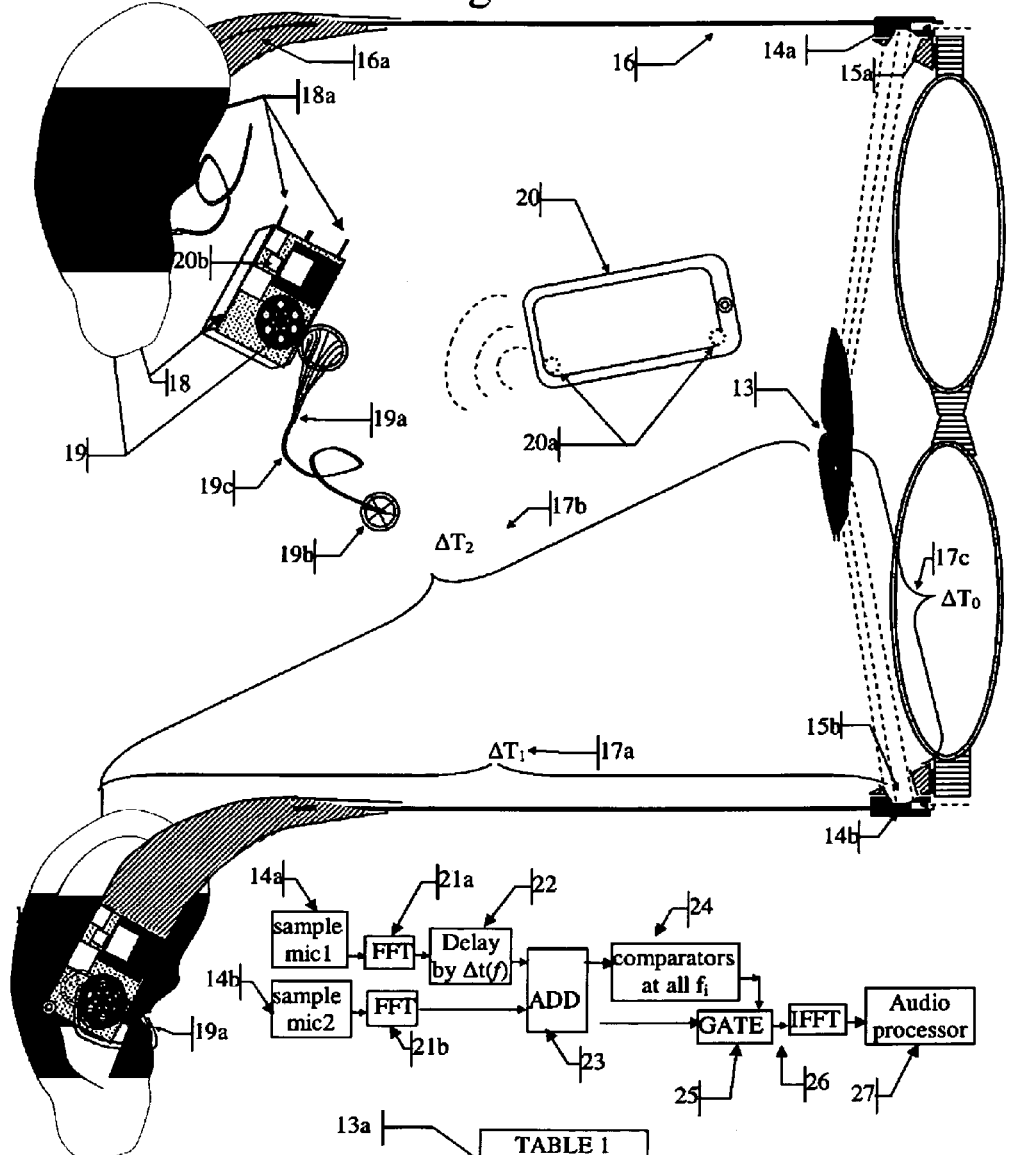
FIG. 2 illustrates Eyeglasses with Hearing aids embedded in the extremities of its bows and distributed hearing aids with components distributed between eyeglasses, cellular phones and stand alone receivers communicating by short range transceivers.
Figure 17:
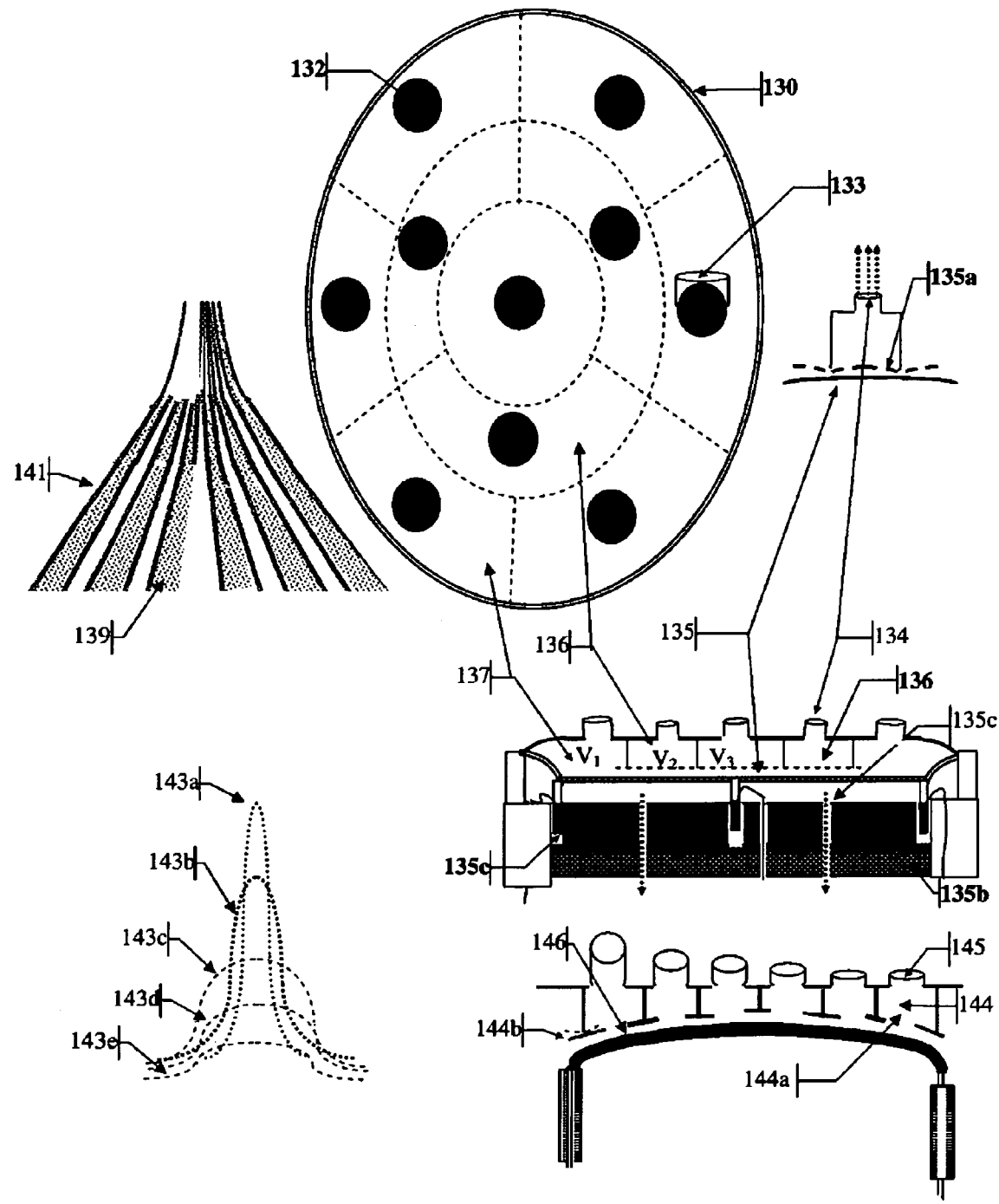
FIG. 17 illustrates a voice coil speaker structured as a combination of dynamic Helmholz cells to achieve a uniform wideband frequency response; it also illustrates a voice coil speaker with a piezoelectric diaphragm and dynamic Helmholz cells attached to tubes of variable lengths to achieve a uniform wideband frequency response.

FIG. 2 illustrates one of the proprietary devices available to the members of the Social Network; a rechargeable hearing aid 18 with advanced capabilities that may be appended 1 onto the extremities 16a of the bows 16 of eyeglasses by inserting pins 18a onto circular receptacles embedded within said extremities. The compact hearing aid 18 contains in addition to the rechargeable battery, a Codec incorporating an advanced audio equalizer, a bluetooth transceiver with antenna, a microcontroller with a large memory, an accelerometer, a microphone and a proprietary wideband receiver 19 whose output is fed through thin tubes 19a to the ear canal of the eyeglasses wearer. The thin tubes 19a merge into a single tube 19c that carries at its end a flexible ring 19b that serves to keep the tube within the ear canal without occluding it. The color of the thin tube that leads the sound into the ear canal may be colored to match the skin color of the wearer. The embedded memory stores the Hearing Correction and Voice Intonation loudness codes of the Caller and various Called parties. Thus, knowing ahead of time the Hearing Correction of a called party enables to modify the outgoing voice call accordingly, when calling people that do not possess telephones with these advanced features. Contrary to balanced armature speakers that have one tubular neck through which the sound is emitted, the proprietary speaker illustrated in FIG. 17 has several necks through which sounds of preferential 220 frequencies are emitted. Consequently a number of tubes may be connected to these necks and gradually merged onto one tube as illustrated in FIG. 17 that leads the merged sound to the ear canal 141. When the receiver is embedded in an earphone, it may be pressed against the ear without the intermediary of the tube.

The bluetooth transceiver enables the wearer of the eyeglasses to link to a cell-phone 20 and thus have access to wireless communications and other data processing capabilities. Many of the speech processing tasks can be done by the cell-phone which is not as constrained as the hearing aid from the points of view of size and power.

Some cellular phones have 2 microphones 20a. These microphones have a fixed distance between them and may be used to detect the direction and loudness of incoming sounds around the cell-phone 230 and particularly speech and noise coming in the direction of the ear. The cell-phone microphones may be used in cooperation with the microphones 14a, 14b embedded in the eyeglasses bows, and the microphone 20b embedded in the stand-alone hearing aids, to improve SNR as explained below. The two microphones on the cellular phone may also find the direction of speech in space and by freely manipulating the cellular phone in space, align the two microphones in the direction of the hearing aid. Consequently the two microphones may serve as the long-arm of the hearing aid and measure the relative intensity of sound coming from different directions, independently from its own microphone. This is a powerful tool, as it enables to transmit from the cellular phone to the hearing aid using the bluetooth transceivers, also specific sounds from specific directions and process them in parallel.

As explained in conjunction with FIG. 16, the accelerometer incorporated in the hearing aid also operates as a Tap sensor; the user can control the various functions of the hearing aid, by Tapping on it from various directions. The accelerometer may also act as a "fall" sensor followed by a "no-motion" sensor, following which it may activate an automatic emergency call, using the bluetooth link to the cell-phone.

The Hearing Eyeglasses features outstanding SNR by eliminating surrounding noise and "chatter" by using at the front ends of its bows, forward looking digital microphones 14a and 14b, in coincidence with the microphones in the Hearing aids embedded at the ends of the bows. The front and back microphones, which are approximately 10 cm apart, will detect the same sound wave at different times, depending on the direction of the source. For a source in front of the eyeglasses, the sound wave will lag by approximately 300 μseconds from the time it traverses the first microphone, until it reaches the second microphone. Consequently delaying the signal of the first microphone by 300 μsec 22 and adding it 23 to the signal of the second microphone, in the frequency domain 21a, 21b, will enhance only the sound arriving from the front; sounds arriving from other directions will be scattered in time. Therefore passing the summed signals in the frequency domain through Gates 25 triggered by signals 255 considerably above the noise 24, will greatly improve the Signal-to-Noise ratio (SNR) in the frequency domain. An inverse FFT 26 will reconstitute the speech signal coming mainly from the front direction. At this stage the audio processor/equalizer 27 of the hearing aid can make the hearing corrections and transmit the hearing-corrected signal to the receiver.

As noise is omni-directional and the front looking solid angle $\Omega$ equals $2\pi(1-\cos\theta)$, a forward angle of 30° subtends a solid angle of only $[2\pi(0.134)/4\pi]=0.067$str., meaning that 94% of the sound coming from all other directions may be eliminated. This is a very powerful tool for eliminating noise and unwanted signals. As the most detrimental factor to intelligibility of speech, is background noise, the two-microphones-in-the-speech-direction is the best tool to improve hearing and intelligibility. Note that the hearing eyeglasses may have one or both bows with hearing aids and front microphones 265 embedded in them. In case the eyeglasses have both bows with hearing aids, the noise rejection feature may be reinforced as illustrated in Table 1 by introducing additional constraints of delays 13a between the front microphone in one bow and the back microphone in the second bow (~350 μsec) and no appreciable delays between the front microphones and between the back microphones.

As mentioned above, these delay constraints apply for sound sources at which one is looking at; for example when someone is talking to a person in front of him, when one is listening to TV or when one is looking at the podium in a concert. These are real life situations that cover many, although not all situations.

When speech reaches the microphones of the hearing eyeglasses from directions other than from the direction the eyeglasses wearer is looking at, the noise may be substantially eliminated using a strategy explained in U.S. application Ser. No. 13/430,728 of the author incorporated here by reference. This noise subtracting method is based on the fact that speech is intermittent and constituted by phonemes constituting, in turn, words, while "noise" is continuous in time. Therefore noise may be eliminated by finding first the relatively quiet periods preceding the beginning of speech phonemes and subtracting any signals in this quiet period from the following speech signals, in the frequency domain.

The front looking microphones in the hearing eyeglasses also have side openings 15a, 15b directed towards the mouth 13 of the eyeglasses wearer and therefore also detect his voice when he is speaking. In this case there is no relative delay between the 2 microphones; as is the case when someone in front of the eyeglasses wearer is speaking.

As both hearing aids embedded in the hearing eyeglasses or earrings have their own bluetooth transceivers, the speech detected by the digital microphones may be transmitted to the cell-phone 20 bluetooth, in a piconet configuration, with the cell-phone bluetooth serving as a master and the 2 bluetooth transceivers at the two hearing aids, acting as slaves. The speech data transmitted by the two microphones may be processed by the microprocessor residing on the cell-phone as explained above. They will be added in the frequency domain and the noise component eliminated by gating the added spectra with signals above the noise level. Table 1 also shows the time delay between the front and back microphones $\Delta T_1$ 17a when the eyeglasses wearing person's voice is detected by the front microphone $\Delta T_0$ 17c and the back microphone $\Delta T_2$ 17b, respectively, which is of the order of 100 μsec. At this stage a decision has to be taken whether to transmit the noise cleaned speech, back to the hearing aids or transmit it to the party the eyeglasses wearer is talking to, through the cell-phone. This conundrum may be resolved in two ways by comparing the detected speech with that of the eyeglasses wearer which is in the memory, and proceeding accordingly or by the eyeglasses wearer to indicate, using the Tap sensor, whether he is on the phone or talking to an interlocutor he is facing. In case the detected speech is that of the eyeglasses wearer talking to an interlocutor in face of him, the noise cleaned speech is forwarded to the calling party through the cell-phone. Otherwise the noise cleaned speech is transmitted back to the hearing aids for delivering to the ears of the eyeglasses wearer after processing for hearing correction.

The other option that does not require much processing, is requiring the eyeglasses wearer to signal, by tapping on the "Tap" sensor, when he takes a call through his cell-phone and "Tap" again when he is through with his call. When he is not taking a call coming through his cell-phone, the voice detected by the microphones in his hearing eyeglasses or earrings are transferred by default to the audio processors of these devices.

The noise cleaned voice of the eyeglasses wearer may be transmitted back to the hearing aids before or after additional audio processing, depending whether the cell-phone has equalization processing capabilities, in hardware or software, or not. In case the cell-phone has equalization capabilities, the noise cleaned speech is first modified in the frequency domain and then transmitted directly to the receivers. In this case the processing capabilities of the Hearing aid are alleviated, saving both space and power.

The Hearing profile of the user is self measured in the TESTs "Sphere-of-Interest" and loaded to the hearing aid's equalizer by wireless, through the bluetooth transceiver. As will be explained below in conjunction with FIGS. 7 through 9 it is important to also take in account the Long Term Average Speech Spectrum (LTASS) of the caller in order to optimize the Hearing capabilities. To this end the characteristic Voice intonation spectra of "frequent Callers" is measured and stored in the memory of the Hearing Aid next to the caller's phone number. The LTASS of the caller is recorded by using the "bi-quad" digital filters of the equalizer in exactly the same "n" frequency bands used to equalize the incoming calls that subsequently are fed to the speaker. In this case the incoming call is recorded in "n" frequency bands for a given time and the respective average intensities, normalized by the average volume of the call, at each of the "n" bands represent the characteristic LTASS of the Caller.

The cell-phone of the member has the capability of further adjusting the loudness of an incoming call as a function of frequency based on the original loudness of the incoming call, as illustrated in FIG. 14 and using the "Tap" sensor illustrated in FIG. 15.

Figure 3:
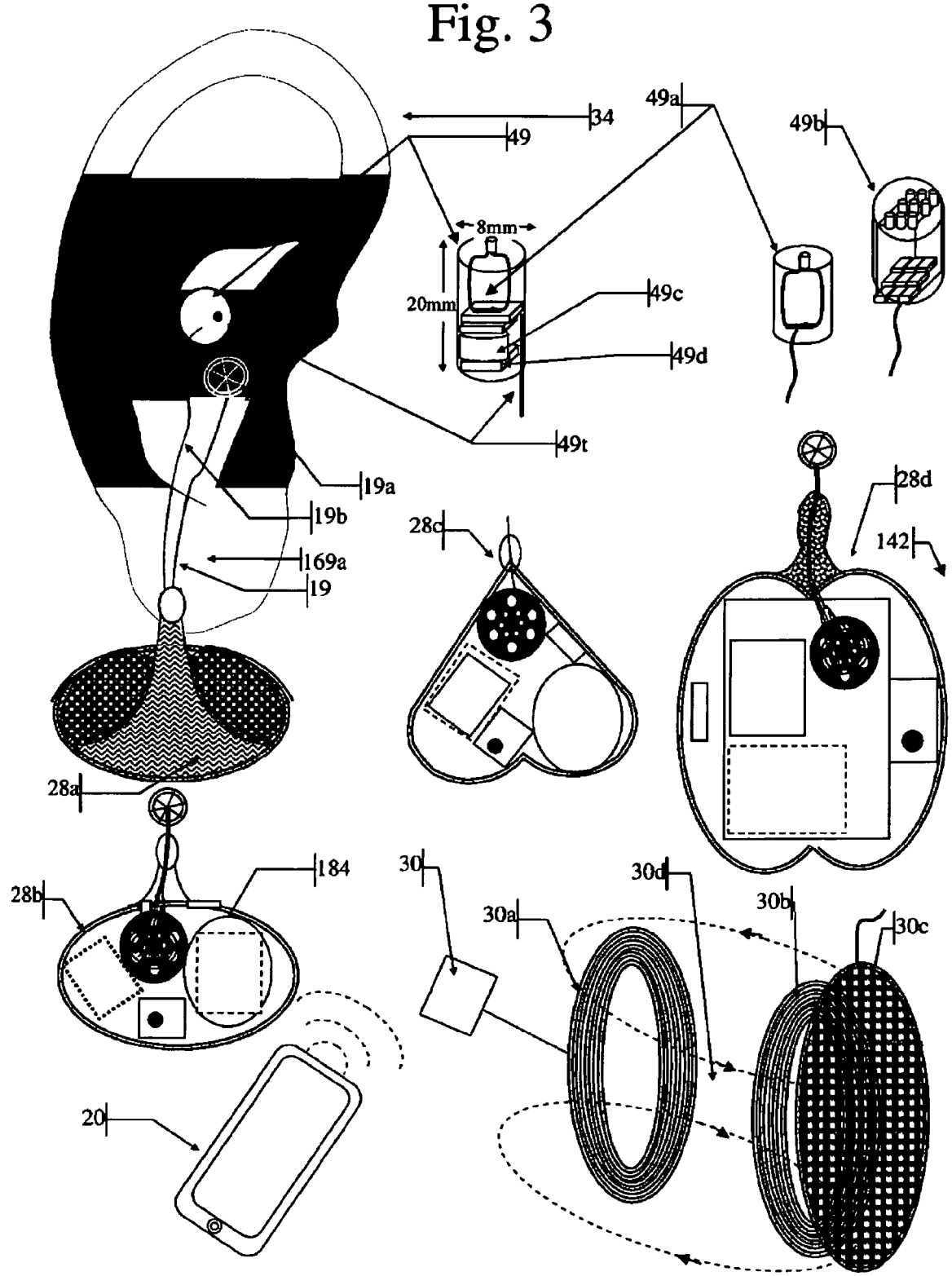
FIG. 3 illustrates Hearing aids embedded in earrings with rechargeable batteries and miniature stand-alone hearing aid components with wireless communication capabilities with cell-phones.

FIG. 3 illustrates another option for packaging the hearing aid in aesthetically attractive form, within shells of "earrings" joined to the ear lobe by a clip. Small earrings 28a, 28b, 28c, may include small primary Zn-air batteries, while larger earrings 28d may include rechargeable Li batteries.

The rechargeable battery may be charged from a distance by transmitting to a coil 30b wound around the internal periphery of the earrings shaped package 30c, an electromagnetic wave resonantly coupled by induction from an external coil 30a at a distance from said internal coil 30b. A high frequency electrical source 30 connected to the external coil 30a and tuned to the resonant frequency between the two coils, transfers to the internal coil a current 30d that serves to charge the internal battery.

The earrings have bluetooth transceivers with antennae that conform to the shape of the earrings. They feature Tap sensors, as explained below in conjunction with FIG. 16 that enable to enter "codes" that control the operation of the hearing aid. Having the hearing aid within an earring shell attached to the ear lobe by a clip is much safer than balancing it behind-the-ear and also less noticed.

The hearing aid comprising a receiver 49a, an equalizer, a bluetooth transceiver-microcontroller, a microphone 49c and a battery 49d may also be packaged in a tubular form 49 for insertion in the ear canal. The receiver 49b may be a distributed receiver able to generate 9 independent frequencies as described below in conjunction with FIG. 19. The antenna 49t of the bluetooth transceiver may be used to insert and retrieve the tubular package into and from the ear canal. The hearing aid functions may be distributed between a miniscule package inserted into the ear canal, containing only an ADC and a receiver, while the rechargeable battery, the bluetooth transceiver, the equalizer and the Tap sensor may stay embedded in the earrings, while using a thin wire 19b to connect the two modules.

Figure 4:
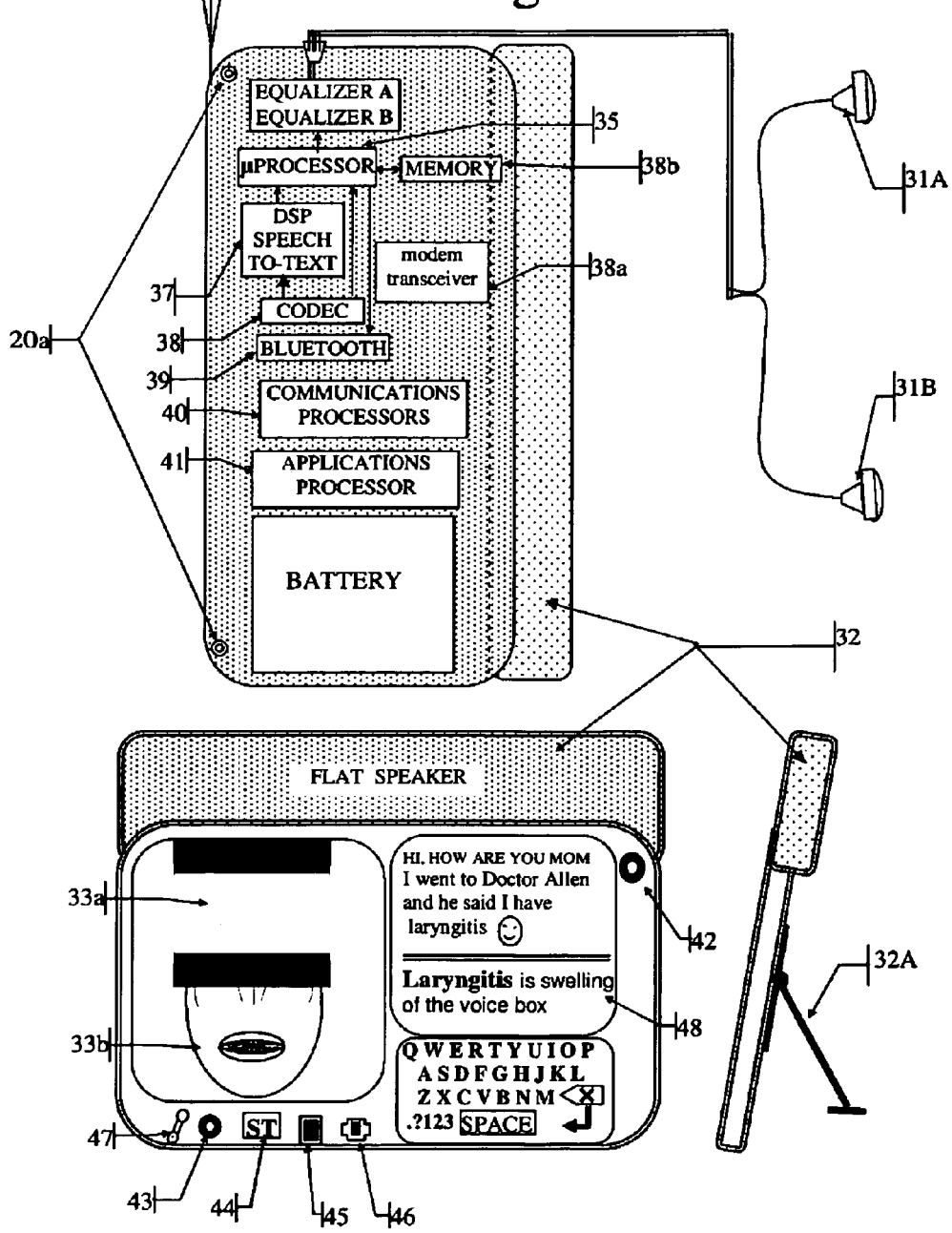
FIG. 4 illustrates the features of a specialized cellular phone for Hearing impaired persons.

FIG. 4 illustrates a cell-phone/tablet with special features for the hearing impaired that differentiate it from general purpose smart-phones. Most of these features may be added to smart-phones as software applications, provided that the operating system allows these applications to run on the system. The special features of the cell-phone support and enhance the capabilities of the Hearing eyeglasses, Hearing Earrings and Hearing corrected Communications.

The cell-phone/tablet's bluetooth transceiver 39 forms a PicoNet with the two bluetooth transceivers embedded in the Right and Left bows of the Hearing eyeglasses or with bluetooth transceivers 355 embedded in Right and Left earrings. The PicoNet network enables several Hearing Aid features to be processed in the cell-phone and transmitted back to the right or left ear receivers.

The Cell-phone for the Hearting impaired comprises in addition to the Communication processor 40, the application processor 41, the Codec 38, the Modem/transceiver 38a and the Bluetooth transceiver 39 that are all parts of all cellular phones of different brands, 2 audio Equalizers 34 connected to 2 external earphones 31A, 31B, and a dedicated microprocessor 35 with a large MEMORY 38b.

The memory 38b which may be an EEPROM contains a large Look-up table that lists the amplification factors at the frequency bands of the equalizer, needed to make the loudness correction in the frequency domain, as will be explained in conjunction with FIGS. 7, 8, 9 and 10. Each set of factors corresponds to a hearing correction based on the loudness of the "Comfortable" level, adjusted for a given Long Term Average Speech Spectrum (LTASS) of the caller, in order to adapt the amplification factors in the frequency domain, to the caller's voice.

The specialized cell-phone features a large flat speaker 32 that has less angular dispersion than cone speakers and consequently delivers more loudness for less power for a constant distance from the listener. The large speaker has a larger frequency bandwidth than the small speakers usually incorporated into cellular phones; it is therefore more suitable for correcting hearing losses at low and high frequencies. The large flat speaker is connected to equalizers specially tuned to compensate for the hearing impairment and the Caller's Voice as it will be explained below.

The cell-phone also features a support base 32a that enables to place the cell-phone on a desk, with the speaker directed to the call recipient. The speaker may also operate alternatively switching from one equalizer to the second one, approximately every 10 milliseconds, expecting that this regime will allow each ear to pick up and correctly interpret the version most suitable to understanding.

The specialized cell-phone may also operate in video format, enabling the call receiving party to display the face of the calling party, dimming the upper part of the face 33a and lightening the mouth and parts of the face around the mouth 33b. This kind of display enhances the ability to "lip-read" the speech that is being uttered, and reinforces the correct interpretation of the phonemes forming the uttered speech.

In addition, in order to better grasp the uttered speech, the cell-phone has a proprietary "speech-to-text" software 37 that also displays the text of the detected speech, in real time, while the listener is viewing the talker, also in real time. The proprietary software for this feature is based on phoneme or syllable 385 recognition, reconciled in real time by the face, lips, tongue and teeth positions during the phoneme or syllable duration. The syllable or phoneme duration is determined by finding the beginning of silence periods, which are also the end of a phoneme or a syllable. The duration of a phoneme being of the order of 100 msec, while the duration of one frame in a 30 fps video is 33 msec, 3 frames may correspond to one phoneme. As there are approximately 40 to 44 phonemes in the English language, the speech recognition module first builds a correspondence between phonemes and so-called VISEMES which is a classification of facial expressions, including lip deformation and visibility of the teeth and tongue. As the correlation between VISEMES and phonemes is not one-to-one, this correlation is determined for every individual that is in the list of frequent callers based on their past live conversations. Still VISEMES may point to several possible phonemes. This indeterminacy is reduced by combining phonemes to get sensible words. We also maintain a vocabulary for every frequent caller listing all the words he may have used in past conversations and try to match the phoneme combinations to these words. Finally, this speech-to-text translation is done within 100 msecs, while the live video is delayed by the same amount, in order to show the text concurrent with the live video of the talker. In fact the Hearing impaired person watching the video of the talker and performing her lip reading may, over the time, decipher the speech faster and better than the automated speech-to-text translator.

When the text-to-speech software cannot come up with a "common" word by combining phonemes, and after checking the caller's common vocabulary, it will go to a medical dictionary and look for a medical term that may fit the combination of words and display the definition of the term in a separate 405 box 48. The button 46 enables selecting the Dictionary explanatory box.

The buttons 42, 43, 44, 45, and 47 enable respectively to start or stop 42, to activate or shut the camera 43, to activate the speech-to-text feature 44, to switch the display to lip-reading-mode 45 and to start a phone call 47.

The Speech-to-Text feature may also be activated by the caller, when he is calling someone that he knows ahead of time, may have a hearing impediment. In this case, he may test the speech-to-text software beforehand and use "words" that he knows translate easily into text. He may also interfere, when he notices a mistranslation and correct some words. The text of the conversation is stored in the memory of the communication device or in a back-up storage device, for further referral.

Figure 5:
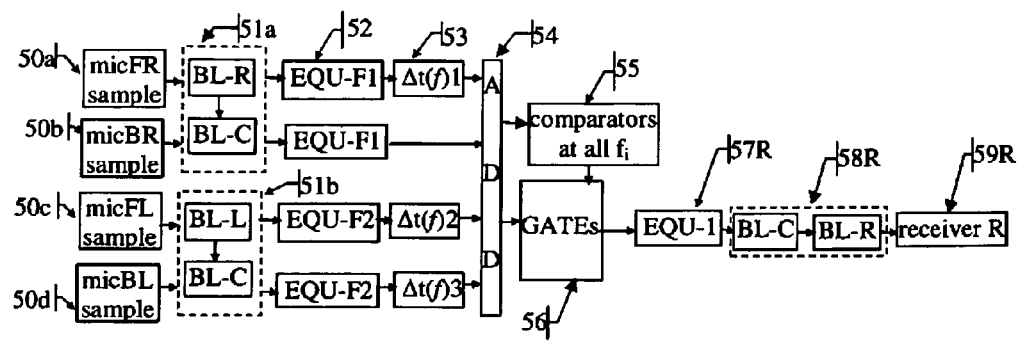
FIG. 5 illustrates noise cancellation using microphones on the bows of the hearing eyeglasses, processed by the audio processor on the cell-phone.

FIG. 5 illustrates the noise elimination feature based on the delays between the 4 microphones embedded on the hearing eyeglasses. For example the Noise elimination feature using the microphones, FrontRight 50a, BackRight 50b, and the FrontLeft 50c BackLeft 50d microphones, described above in conjunction with FIG. 2 may be processed in the cell-phone. The digitized speech signals in the time domain are transmitted, using the bluetooth transceivers BL-R 51a on the Right and BL-L on Left 51b, to the Cell-phone using its bluetooth transceiver BL-C.

Two equalizers 52 used as arrays of filters EQU-F1 and EQU-F2 transform the signals from the time domain to the frequency domain where 3 of the signals, the FrontRight, the FrontLeft and the BackLeft microphone's signals in the frequency domain 53 are delayed by approximately 300 μsec, 350 μsec and 0 μsec respectively and added 54 to the signal of the BackRight microphone in the frequency domain. The added signals in the frequency domain are then passed through Gates 56, triggered by the high amplitude signals above the noise levels, in each of the frequencies, selected by comparators 55. As the noise signals are below the comparators' triggering levels, they do not trigger the comparators and consequently only the speech signals pass through the Gates 56. These signals are then fed to the Equalizer EQU-1 57R that is set with the proper amplification factors at these frequencies for the Right ear and its output is transmitted by the bluetooth transceiver of the cell-phone to the bluetooth transceiver of the right ear BL-R 58R which transfers the signal to the DAC of the receiver of the Right ear for translating the digital signals to Sound.

The processing of the speech detected by the 4 microphones for the Left ear is done in a similar way by using the appropriate delays in respect to the Back-Left microphone.

Figure 6:
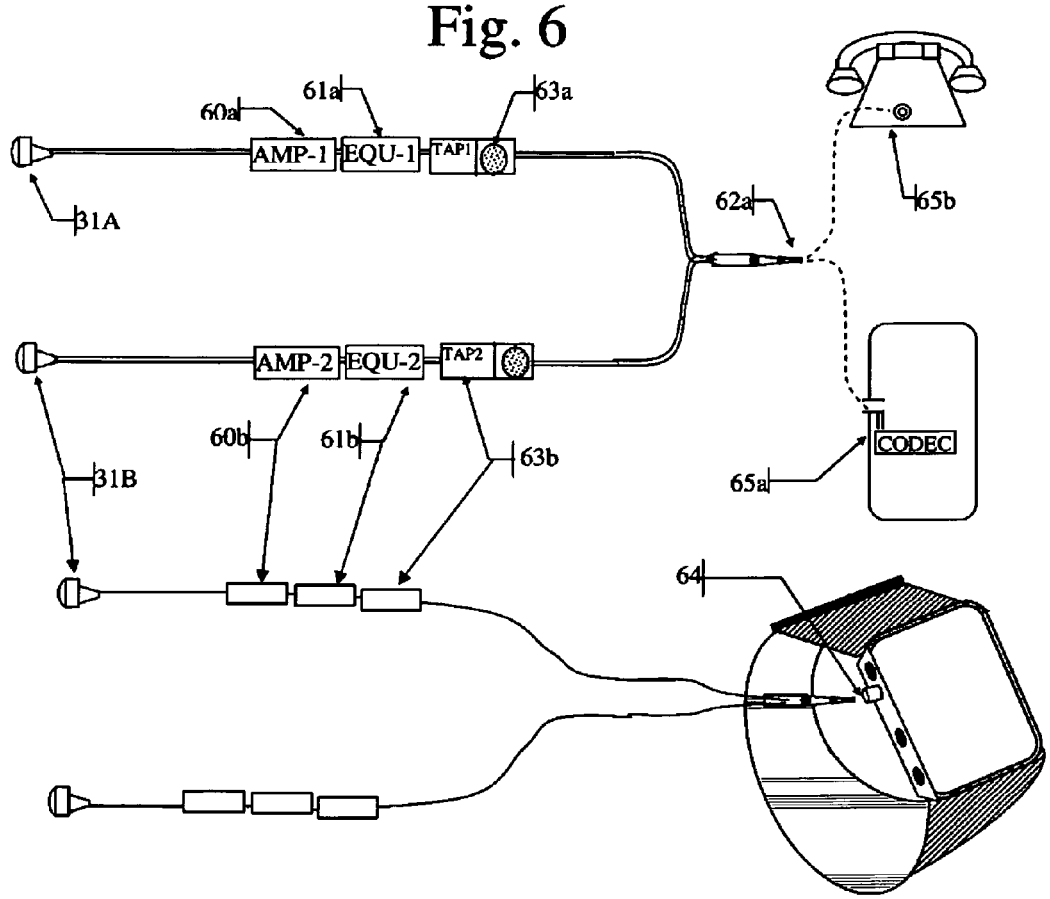
FIG. 6 illustrates a set of earphones with preset hearing correction for each ear separately that can connect to any audio source.

FIG. 6 illustrates a pair of earphones 31A, 31B incorporating personal hearing corrected electronics for each ear, embedded, in the cords of the earphones that may be plugged to the voice output 65b of regular POTS telephones or to the earphone outputs 65a of various implementations of cellular phones, such as hand-watch type 64 cellular phones.

The specific loudness for a "Comfortable Hearing" level of hearing for each ear may be self measured using the cell-phone tone generator. These loudness factors may be stored in the memory of the cell-phone and used to bring the loudness of incoming calls at these frequencies to the Comfortable level, as explained below in conjunction with FIGS. 5 to 10.

The loudness adaptation of the incoming call may be implemented by software in the application processor 41 of the cellphone or by the hardware equalizers 34 in the special cell-phone for the Hearing impaired described in conjunction with FIG. 4 above. However the adaptation may also be done in the earphones by incorporating onto the earphone cords, the equalizers 61a, 61b. The user can still amplify or attenuate the sounds using the amplifiers 60a, 60b embedded in the cords. The power for the equalizers and amplifiers may be obtained from the cell-phone's earphone socket through the plug 62a or may be supplied by an embedded battery 63a.

The programming of the equalizer may also be done using an accelerometer used as a Tap sensor 63b as explained below in conjunction with FIG. 16.

The receiver of the earphones pluggable to the ear is an important component that contributes to the clarity of the sound. The bandwidth of the receiver/speaker illustrated in FIGS. 17, 18 and 19 extends from deep basses to high frequencies above 10 kHz. The technology consists in combining several Helmholtz cavities, each tuned to different frequencies, while their relative loudness may be tailored using audio equalizers. The special earphones combining equalizers and Helmholtz cavity resonators achieve both extended bandwidth and flat loudness at the same time.

Figure 7:
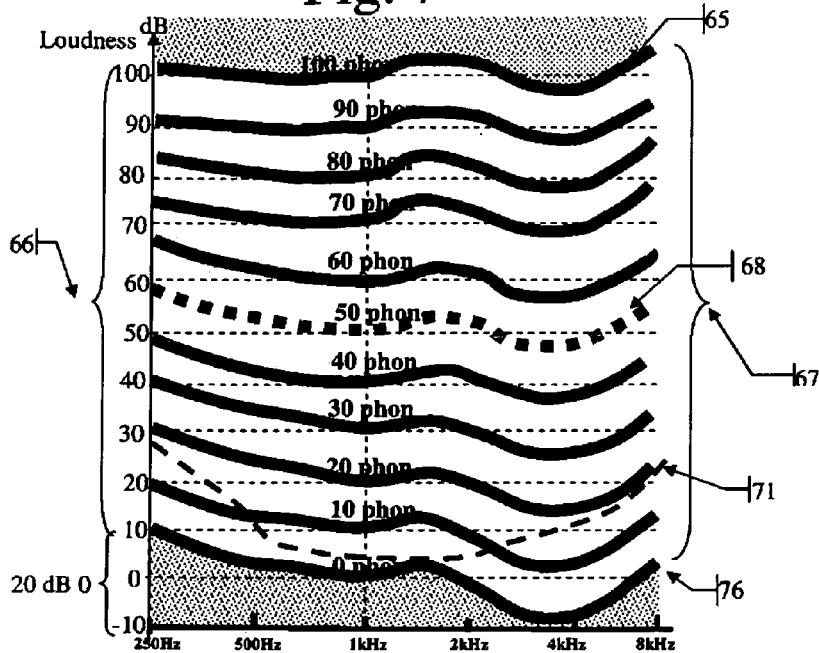
FIG. 7 illustrates the Hearing loudness levels in the frequency domain, of the hearing impaired and its Comfortable Hearing perceived loudness level.

FIG. 7 illustrates the levels of equal loudness sensitivity as a function of frequency, starting from the threshold of hearing 71 to the highest level of tolerable loudness 65, which in this case is 100 phons. The unit of loudness is "phon" defined as the Sound Pressure Level in dB at MHz. The equal level contours are defined by the international standard ISO 226: 2003. The mid "equal loudness level" between the threshold of hearing 71 and the "excessively loud" levels is the level 68, labeled as the 50 phons loudness. The personal "Comfortable Hearing Loudness" level is measured as described below. In this invention, the goal of the "hearing correction" is to bring the average loudness level of heard voices to the comfortable level, while making sure that all frequencies relevant to intelligibility are heard. The threshold 71 of hearing loudness as a function of frequency is not a linear function, but increases both in the low frequencies and high frequencies. The Hearing loudness range at low frequencies 66 is smaller than at high frequencies 67; this range is measured during an audiometry test. Loudness is a subjective term, as defined by ANSI "that attribute of auditory sensation in terms of which sounds can be ordered on a scale extending from quiet to loud."

The figure illustrates the threshold of Hearing of a "normal" person 76 and that of a Hearing impaired one 71. The hearing of a person is defined as "normal" 76 if his hearing threshold is within a band of 0 to 20 dB, meaning that even people defined as of "normal hearing" may benefit of from slightly boosting the loudness of speech, specially at low and high frequencies. The hearing threshold spectrum of the hearing impaired person 71 may be much above that of a "normal" person at the low and high frequencies although in the mid frequencies at 1 kHz to 3 Khz it may be close to that of a "normal" person. This is the reason that people notice their hearing impairment, only when they stop hearing the mid frequencies at low volumes.

Contrary to the general belief, the goal of the hearing correction is not to bring the hearing threshold of a hearing impaired person to that of a "Normal" person or to near to "0" dB or slightly above it. Adding to the loudness of a sound, the amount needed to bring the Hearing threshold of a person to that of a normal person, will "overcompensate" for the loss, specially at the low and high frequencies. Some Hearing correction models add only a given fraction (⅓ to ½) of the loudness difference between the Hearing impaired and normal persons at threshold, to the loudness of a normal person. The strategy employed in this invention is to assume that the loudness level at which a hearing impaired person is "comfortable" with, is ipso facto the loudness at which he is able to hear "best"; it already includes the fraction of the difference between a "hearing impaired" person and a normal one, needed to compensate for the hearing loss; the loudness "comfort" also contributes to the "intelligibility" of what one hears as his mind is not busy fighting neither an excessive loudness level nor in deciphering weak sounds.

Our goal therefore is to bring, the loudness levels heard by a hearing impaired person, at a wide range of frequencies, to that level at which he feels "comfortable" to hear. This goal is achieved by amplifying low volume sounds and attenuating high volume sounds, taking in account that the measured loudness levels are different than the perceived loudness levels.

The dynamic range of hearing loudness is frequency dependent. Perceived loudness as a function of frequency may be "estimated" through a Q&A session by a person listening to sounds (preferably to no-sense words covering several frequencies) of varying intensity. The person may listen to sounds of varying frequencies covering a range of loudness from 0 dB to a maximal loudness sensed as "excessive" by him and covering frequencies of 125 Hz to 8 kHz, emitted by calibrated loudspeakers or through earphones and is asked to classify them in several easy to decide categories. The entire range of loudness may be divided into 5 easy to decide levels (6 bands) between the threshold (don't hear) and the highest "unsupportable" (offensive) level. These levels are usually named as "too faint", "soft" "Comfortable" "Loud" and "Too loud". For the highly hearing impaired, where the entire range may be as small as 60 dBs, this means 10 dB wide bands. For the slightly hearing impaired, where the entire range may be up to 90 dBs, this means 15 dB wide bands. It is important to realize that listening through earphones or directly to sounds coming from loudspeakers is different and result in different equal loudness levels. This difference and the nature of the tones is widely elaborated in our application Ser. Nos. 13/430,728 and 13/495,648 incorporated herein in their entirety by reference.

Once the "Comfortable" loudness level is roughly found, an "Optimal" level of intelligibility in the "Comfortable" level band may be established by querying the understanding of a list of nonsense words incorporating phonemes of a wide range of frequencies, at the previously established "Comfortable" loudness level and ±4 to 10 dB around it.

The resultant "Optimal" hearing loudness levels, for direct or through earphones listening, is the level at which we aim to bring the loudness of voices heard directly or through cell-phones.

The "perceived" loudness curves versus the emitted Sound Pressure Levels (SPL) are to be used when amplifying or attenuating the incoming sound in order to bring them close to the individual "Optimal" level of hearing.

Figure 8:
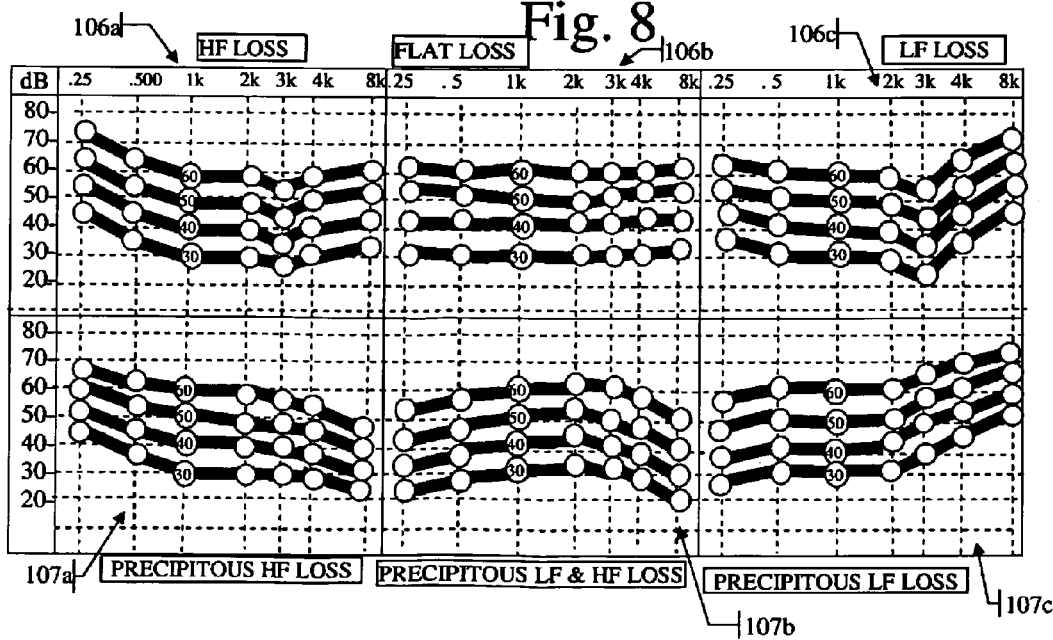
FIG. 8 illustrates a model for estimating the number of possible variants of the "Comfortable" Hearing perceived loudness level as a function of frequency.

FIG. 8 illustrates 24 possible "equal loudness levels" of the "Comfortable" level as a function of frequency in the 250 Hz to 8 kHz band. Note that although the "equal loudness" curves sound "equal" to the hearer, they actually span a wider range of Sound Pressure Levels (SPL) in the 250 Hz to 8 kHz frequency domain.

The possible "Comfortable" equal loudness levels relate to 6 basic shapes in the frequency domain at loudness levels of 60 phons, 50 phons, 40 phons and 30 phons. The different shapes are related to the "High Frequency Loss" 106a, "Flat Loss" 106b, "Low Frequency Loss" 106c, "Precipitous High frequency Loss" 107a, "Precipitous Loss both at High and Low frequencies" 107b and "Precipitous Low frequency Loss" 107c of hearing impairment. The figure illustrates the fact that there are only a limited number of "Comfortable" hearing levels, stemming from the fact that the "Comfortable" assessment by the tested person is subjective and has an error range of ±5 dB. Thus the "comfortable" levels of 60, 50, 40 and 30 phons have to be interpreted as bands of (55 to 65), (55 to 45), (45 to 35) and (35 to 25) phons A "Comfortable Loudness band" being approximately at the middle of the hearing loudness range, a low Comfortable loudness band of 25 to 35 phons means that the entire hearing loudness range is around 60 dB and points to profound Hearing Loss, although its degree of hearing loss is frequency dependent. In a similar way a high Comfortable loudness level of 55 to 65 dB phons means that the entire loudness range is around 120 db, points to the general fact that the Hearing impairment in the mid-frequencies is minimal, although at low and high frequencies it may be large.

In all instances the "Comfortable loudness band" represents the optimal level of hearing that incorporates the hearing losses at different frequencies and loudness levels. In our invention all speech sounds should be attenuated or amplified in order to bring them to the vicinity of the "Comfortable loudness band" while preserving the limited loudness dynamic range of sounds within words. This requirement means relatively long "attack" and "release" time constants when amplifying or attenuating loudness levels.

An actual set of "Comfortable Loudness level" variants may be accumulated starting from the model illustrated in FIG. 8 where the distance between adjacent curves $D_L = \Sigma_f (L_A)_m - (L_A)_p$ has to be no more than $[N_f]5$ dB. This set of "Comfortable Hearing level" curves may be enlarged by adding to it curves that at any frequency deviate from the closest "Comfortable level" in the current model, by more than 5 dB.

The evolving set of curves still will comprise a finite number of "Comfortable Hearing Loudness" levels and may be represented by a Code that may be added to a person's telephone and/or mobile phone number(s).

The "Comfortable Hearing level" obviously may be different for the Right or the Left ears and the path of the sound to the ear, whether through earphones or through the air, from a frontal direction or from the side. Thus the "Comfortable level of hearing" in each mode of listening to incoming speech can be represented by a different code and these codes added to a person's phone number after the dialed number, for example.

Figure 9:
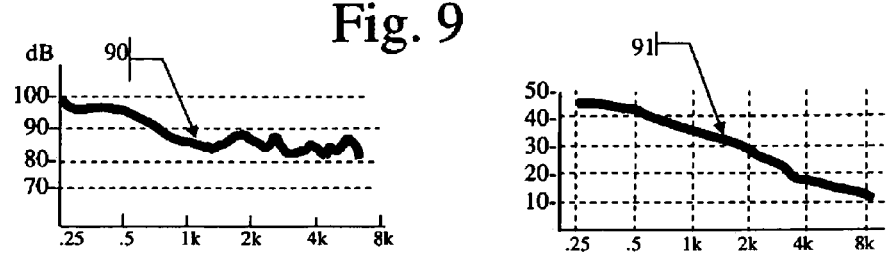
FIG. 9 illustrates exemplary Long Term Average Speech Spectrum (LTASS) of a group of men and a group of women.

The goal of the hearing correction, in our system, is to bring the loudness of voices reaching the hearing impaired person, to his "Comfortable" hearing level or close to it. Obviously every phoneme and every word has its own spectrum and dynamic loudness range; however we still can differentiate between people uttering the same word. While the fundamental frequencies of a Bass voice are in the range of 80 to 330 Hz, that of a Tenor are from 120 to 700 Hz and that of Soprano may change from 185 to 1050 Hz. Any utterance contains in addition to the fundamental frequencies also multiple harmonics; however most of the energy is in the fundamental frequencies and first formants. The Loudness as a function Frequency may be recorded over a longer time period and is known as the Long Term Average Speech Spectrum. Two exemplary LTASS functions, one of men 90 and one of women 91 are illustrated in FIG. 9. Both figures illustrate the concentration of energy in the low frequencies and the gradual decline with frequency, although the decline rate is different between the two exemplary figures.

From a signal-to-noise ratio point of view, it is better to give more weight to the frequencies mostly used by the caller, when bringing the general loudness level of a call to the "Comfortable" level of the called party. This general correction can be adjusted when an actual call is received and its loudness measured.

Figure 10:
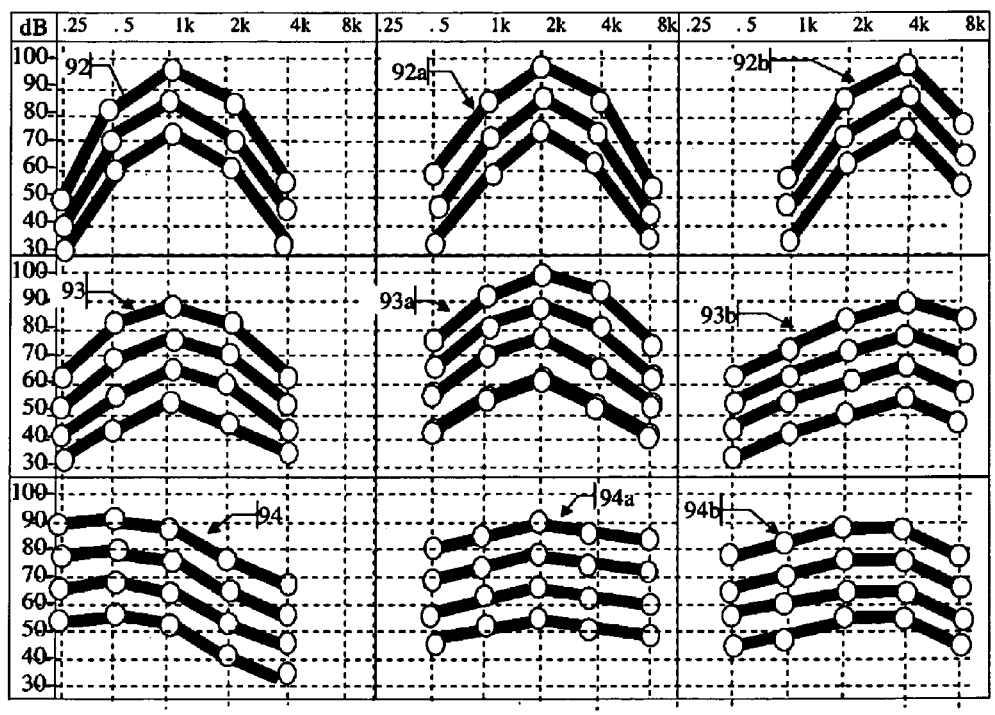
FIG. 10 illustrates a model for estimating the number of different variants of Voice Intonation loudness and the Long Term Average Speech Spectra.

FIG. 10 illustrates a model for estimating different variants of "Voice Intonation" Spectrum of callers, as a function of loudness. The general shape of a Voice Intonation Loudness curve in the frequency domain is down sloping from the resonant frequencies at gradually decreasing loudness at lower energy harmonics.

The sound forming elements of the human mouth generates resonant frequencies called "formants"; the first resonance frequency $f_1$ (first formant) is usually able to generate more energy than the following resonances ($f_2$) and ($f_3$). However as these resonances are specific to consonants and vowels, they average over a multitude of words, and do not show in recordings of the Long Term Average Speech Spectrum of a person. However the ability to generate formants of diverse intensities determines the overall loudness shape of a personal LTASS curve. The shape of the loudness curve in the low frequencies up to 500 Hz is slightly ascending. From low frequencies to high frequencies the loudness decreases moderately. The shape of the individual spectra may also peak at 1 kHz to 4 kHz depending on the individual abilities to generate harmonics.

In FIG. 10 the possible variants of the Voice Intonation Loudness in the frequency domain are illustrated. The first, second and third rows of spectra illustrate voices with loudness ranges of 40 dB, 30 dB and 20 db respectively starting from an average loudness of 85 dB high 92 to an average of 25 dB low; this span of loudness reflects our assessment of voice loudness expressed in telephony calls. Within this average loudness scale, the various shapes of decreasing loudness as a function of frequency are listed. The first, second and third columns list Voice spectra with a peak at 1 kHz, 2 kHz and 4 kHz 92, 92a and 92b, while the first, second and third rows list shallower shaped Voice spectra (93, 93a, 93b for the second row and 94, 94a and 94b for the third row). In our model, the distance between any two neighboring "Voice Intonation Loudness" curves in the frequency domain is 10 dB (±5 dB), which is the margin of error in assessing loudness experimentally. Consequently, any measured personal "Voice Intonation Loudness" curve may be approximated by one of the 33 curves delineated in this model. In this model 33 different Voice Intonation Loudness modes in the frequency domain of 250 Hz to 8 kHz are listed. Our claim is that any Voice Intonation Loudness curve in the frequency domain, may be approximated by one of the 33 standard curves delineated in FIG. 10, in the sense that its distance "D" in the frequency domain of 250 Hz to 8 kHz, from the closest standard curve is less than ±5 to 7 dB. Obviously there may be in the frequency domain other loudness distribution curves with less occurrence, which may gradually be incorporated in the model in view of assigning to any person one of the "standard" speech intonation characteristics. This personal standard Speech intonation characteristic may be represented by a code that may be added to a person's telephone number and/or his mobile phone number and used for adapting any person's hearing characteristics to the specific Voice of the interlocutor or caller.

A person's default "Voice Intonation Loudness" code is related to the specific telephony device used to make a call, the position of the microphone of said telephony device in relation to his mouth, the surroundings from which the outgoing call is made and other specific conditions as his oral health. Accordingly a person may have several "Voice Codes" different from the "default" one; he may change his default "Voice Code" from time to time and/or transmit to the "Hearing Correction" server the "Voice Code" he will be using in a call by transmitting it to the Hearing correction Server, for example by adding it before or after the dialed number.

FIG. 11 illustrates the use of the limited set of digital filters of an equalizer, used as a spectrum analyzer, to measure the Voice Intonation spectrum of an interlocutor directly or a caller through a telephony device. The voice of the person is detected by a digital microphone 96 and sampled at a high frequency (16 to 96 kHz for example) 97 and fed to a digital equalizer 98. The digital equalizer consists of a series of bi-quad band-pass filters covering the desired frequency bandwidth. Thus each sample is decomposed into (i) frequency components; all consecutive (n) samples follow the same route and accumulate in bins (98*l*) to (98*i*). The relative distribution 100*a*, 100*b* in the frequency domain defined by the (i) filters is obtained by dividing the content of each bin by the number of samples (n) 99*l* to 99*i* or by a magnitude proportional to (n), for example by time ($\Delta t$) of the measurement. As the Fast Fourier Transform is very compute intensive, in many cases specially in audio, it is suitable to use a limited number of band-pass filters do decompose speech in the time domain, to its frequency components by using a limited number of digital band-pass filters.

FIG. 12 illustrates the modification of the optimal hearing loudness function in the frequency domain, by taking in account the Voice Intonation Spectrum of the caller. The modification described in this invention is different from the "Compression" features used in previous art hearing aids that consist in non-linear amplification of incoming calls, independently of the specific long term voice spectrum of the caller.

As the loudness of the "comfortable" level ($L_{CS}$) 104, between the threshold 104*a* and the offensive loudness level 102, in the frequency domain is measured individually in dB units above "0", it already reflects and includes the minimal loudness needed to reach the threshold of hearing ($A_T$) 104*a*.

The caller's Voice Intonation Spectrum ($V_S$) 103, which is measured in advance, in Sound Pressure Level (SPL) terms has first to be translated into "Perceived Loudness" levels of the Hearing impaired person. This is done by finding the perceived Loudness level in Phon units equivalent to the measured SPL at 1 kHz 103*a*. The perceived loudness of the Voice Intonation curve in the frequency domain, is then assumed to be the same as the perceived loudness at the same Phon level.

The Voice Intonation Spectrum of the Caller is then brought close to the comfortable level of the called party, by finding the average loudness in the frequency domain 105 in relation to the loudness of the "comfortable level" $L_{CS}$ 104 of the called party $1/S[\Sigma_S(V_S/L_{CS})]$ and then multiplying (or dividing) the original loudness of the Callers voice $V_S$, by this factor $(1/S)(V)_S[\Sigma_S(V_S/L_{CS})]$. This operation changes 105*b* the volume of the call in the frequency domain.

This adaptation of the "comfortable" loudness level to the predetermined level of incoming sound of the calling person, accomplishes a major part of adapting the volume of the "hearing aid" to incoming calls. The Hearing aid wearer still has the option of fine tuning the volume, when the "Voice Intonation Spectrum" of the caller is not known and cannot be loaded immediately with the start of the call. The "Voice intonation Spectrum" of frequent callers can be recorded and updated with each call; it can be loaded as soon as the caller's ID can be established, for example using a caller ID and a Look-up table.

Figure 13:
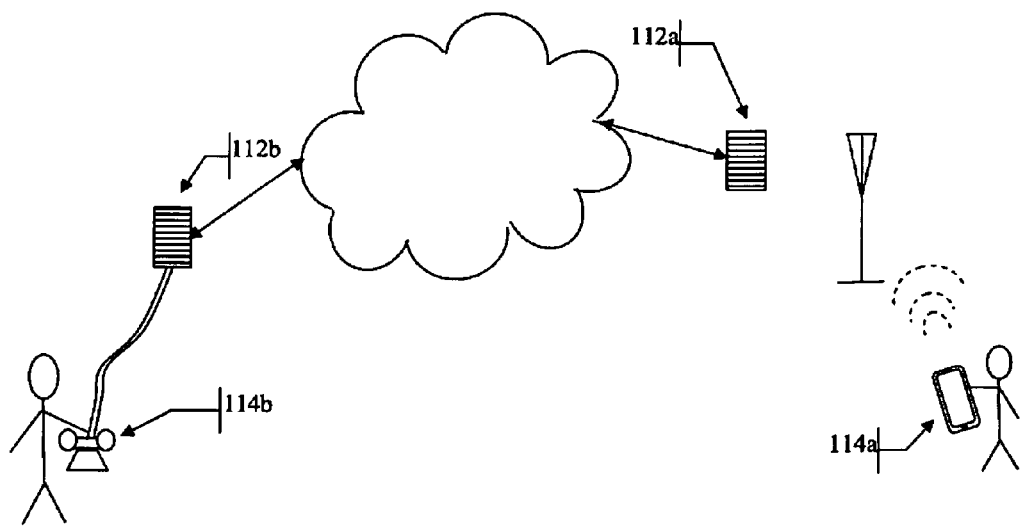
FIG. 13 illustrates the route of a telephony call between 2 subscribers and the correction of a Voice call en-route, in a proxy server that may be placed in the gateway of a communications network.

FIG. 13 illustrates the route of a telephony call between 2 subscribers 114*a*, 114*b* and the correction of a Voice call en-route, in proxy servers 112*a*, 112*b* that may be placed in the gateways of the communications networks nearby routers and switch servers.

The hearing correction consists in multiplying the volume ($V_S$) in the frequency domain, of a wireless or landline telephony call, on its way from the caller to the called party, by frequency dependent 665 constants $(1/S)V_S[\Sigma_S(V_S/L_{CS})]$ as explained above in conjunction with FIG. 12.

These are constants specific to the Caller and the Called party that may be measured ahead of time and tabulated for every user. In fact as illustrated in FIGS. 10 and 8, the number of different Speech Spectra of the caller and the variants of the Comfortable Loudness of the called party are limited. In our models there are only 33 variants of "Voice Intonation Loudness levels" and 24 variants of Comfortable Hearing Loudness Levels, for each ear or 48 variants for both ears. Consequently any telephony user, according to our model, may be characterized by one of the (48)×(33)=1584 pre-measured parameters pre-stored in a look-up table. Two 8 bit words, are sufficient to specify one "Voice Code", the first byte specifies the "Comfortable Loudness levels" of both ears, while the second byte is more than sufficient to specify the "Voice Intonation Loudness" of the person.

A two-way telephony call may be adapted to the called party's Comfortable hearing level by modifying the loudness level $V_S$ of the call by the ratio as mentioned above, thus bringing the loudness level of the call closer to that of the Comfortable level ($L_{CS}$).

The Comfortable Loudness level curve incorporates the limited additional amplification needed, given the Hearing Threshold at the various frequencies and the contracted span of loudness perception by the Hearing impaired.

Figure 15A:
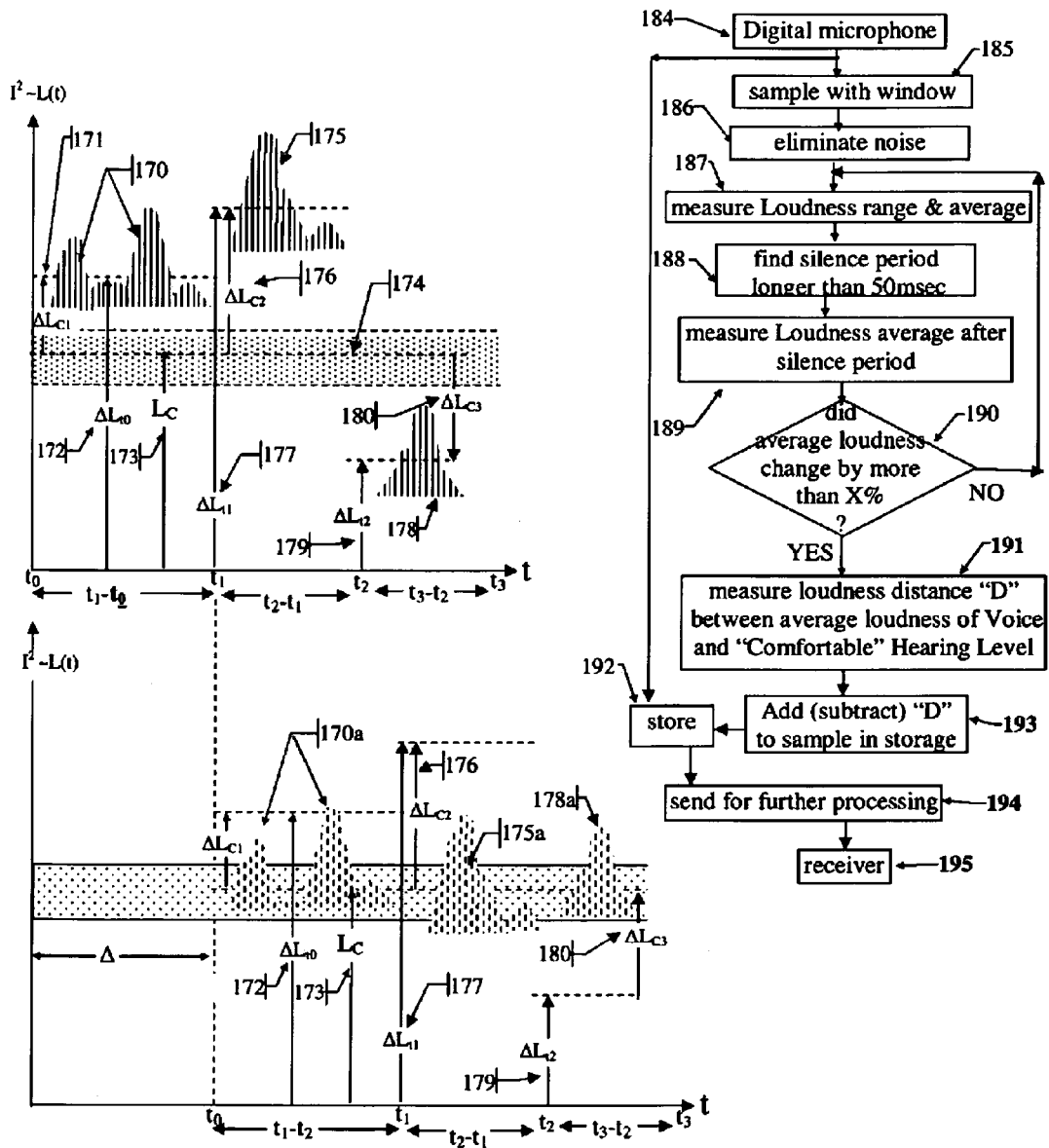
FIG. 15a illustrates another method for modification of the optimal hearing loudness of a hearing impaired person by translating incoming speech of various loudness levels to a loudness band around the "Comfortable" equal hearing loudness level, thus compressing the loudness of incoming speech without changing the short term dynamic loudness range of words.

However as illustrated in FIGS. 14, 15 and 15*a* there are additional "Hearing Correction" algorithms that modify the incoming calls in real time, taking in account the varying spectra of words that are different from the Long Term speech characteristics of callers. In a universal model of Hearing Correction based on the premise of modifying the "Comfortable Hearing Loudness" level as a function of the Loudness and Spectrum of the incoming Speech, the different models may be viewed as alternatives suitable to different situations. Thus the different correction models, including the prior art of WDRC, may be integrated as parameters in a universal "hearing correction" theory; some of the Hearing correction models that being too compute-intensive are today considered as not practical, may in the future become practical.

As the "hearing correction" application relates to a specific call between two parties, and the elements of the correction are applicable to a multiplicity of calls between various individuals, the specific hardware-software system may be time-shared for correcting sequential calls between different parties that have the same identifiers. It makes then sense to have a multiplicity of duplicate systems in order to service calls between parties that have the same identifiers, namely the same "Comfortable hearing loudness" or the same "Voice Intonation Loudness", although being different individuals. As there is, most probably, a statistical distribution of calls between certain parties having the same specific identifiers, the duplicate systems should not cover all possible combinations of "identifiers" at all times but have several types of systems.

One type of Hearing Correction system should be optimized for minimal latency and have all the functions and hardware equalizers pre-set and directly activated by the "Voice Codes" of the callers, while the second type should be a configurable system with software configurable equalizers, depending on the "Voice Codes" of the source and destination addresses and therefore would have a larger latency.

The optimal size (S) of a "Hearing correction" system in terms of the number of equalizers operating in parallel, all using the same algorithm, is dependent on the number ($\#_C$) of different "Voice Codes", the number of different subscribers (N) to the service and the average time of a call ($\Delta T$) per day. For a system required to service every subscriber promptly, the size of the system (S) could be the average number of subscribers that are actively talking (N)($\Delta T$). For example for 100,000 subscribers that on the average spend ~10 minutes a day talking on the phone, the average number of people, talking all at the same time, is 700. As the number of different Voice codes according to our model is 792, this means that one system with 2×800 equalizer circuits, one for each direction of a call, all preprogrammed in advance and operating in parallel, can take care of the Hearing correction of 800 subscribers at a time. A Large FPGA with 2000 PGA socket can house 40 equalizer circuits; therefore 40 FPGAs in several boards could handle the Hearing Correction of 800 subscribers with different Voice Codes in parallel.

Figure 13A:
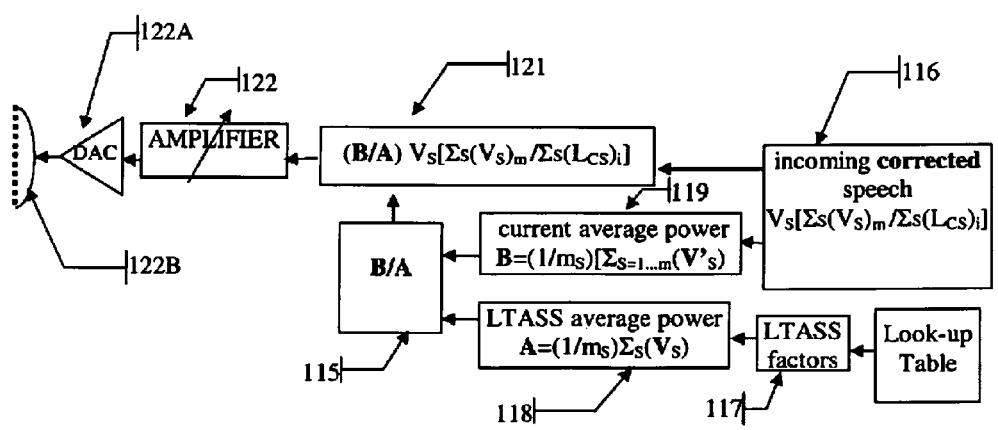
FIG. 13a illustrates the Hearing correction of a Voice call as a function of frequency and loudness at the user's telephony device.

FIG. 13a illustrates the correction of the Voice call as a function of frequency and loudness at the actual time of the call, in addition to the adaptation to the Caller's Average Speech Spectrum. Adapting 116 the called party's "Comfortable Hearing Loudness" level to the Caller's average speech 720 spectrum takes in account the Caller's major speech identifiers, whether he talks like a "bass or a "tenor", whether he usually talks "loudly" or "quietly" for example.

However the Caller's speech volume may change from one call to another and certainly from one utterance to another, as it contains different combinations of audio frequencies. The change in the callers Speech Loudness in real time, can be taken in account by measuring the loudness of incoming 725 speech 119 and comparing it with the Loudness of the LTASS 118 determined by the factors 117 set ahead of time; the ratio of the two 115 is then used to modify the current loudness $(1/S)V_S[\Sigma_S(V_S/L_{CS})]$ by delivering to the speaker 122B the currently received speech modified by the ratio of the current average power by the LTASS average power 121. The user can still fine-tune the loudness using the variable amplifier 122 followed by the DAC 122A that feeds the speaker 122B.

However this adaptation is effective on the average and may be improved if the momentary loudness changes at the different frequencies are also taken into account. If the loudness of the incoming speech is different than the one assumed beforehand, the loudness of the comfortable level, can be adapted, as illustrated above in FIG. 13a.

FIG. 14, illustrates a method of adapting the Comfortable Hearing Loudness of a call recipient to the loudness of incoming calls detected by a microphone 96, setting thresholds levels 108 and, attenuating the loudness of incoming calls above the "Comfortable" level and amplifying the loudness of incoming calls below the "Comfortable" level, thus bringing them closer to the "Comfortable" level.

Note that this is different than the prior art's Wide Dynamic Range Compression (WDRC) that consists in applying a different gain to incoming speech, depending on its loudness and frequency span. The WDRC method does not accord to the "Comfortable" level any specific importance, while in our attenuation/amplification method there is a band 110 around the "Comfortable" level 104 between the threshold levels 109u, 109d as a function of frequency_where incoming speech is neither compressed nor amplified. Incoming speech above this "neutral" band is compressed downward 108a, while incoming speech below the "neutral band" is amplified upwards 108b.

As the "Comfortable" loudness level reflects both the Hearing threshold's non-linearity 71 as well as the non-linear increase of loudness with SPL intensity (recruitment), the threshold levels 109u, 109d also denominated in "Phon" units, may cover in dB SPL units a considerable range of 10-30 db as a function of frequency. Therefore the decision of whether to attenuate or not, ought to be done in the frequency domain, for every phoneme and syllable. As the duration of a phoneme or syllable may be as short as 10 msec, this constraint means that the process of measuring the loudness of the incoming speech in the frequency domain and changing the amplification or attenuation factors, ought to be done in a short time of the order of milliseconds. However as the shape of the neutral band is no sacrosanct, the upper and lower thresholds of the band may be straight lines 109ut, 109dt in the frequency domain or constants in the time domain, thus simplifying the attenuation/amplification model. The key feature of this "Hearing Correction" algorithm is that the incoming speech should not be interfered with, if its amplitude is around the "Comfortable level", as this level already incorporates both the Hearing loss and recruitment effect. Sound volume close to the "Comfortable" Hearing level, should neither be amplified nor attenuated.

Above and below the central band around the Comfortable Hearing level, both the downward attenuation and upward compression rates should be aggressive, as the duration of a syllable or a phoneme could be as short as 10 msecs and therefore the sound ought to be brought near the "Comfortable" loudness level within several milliseconds or less. Thus an attack level of 5 dB/msec. would be suitable.

The difference between our method of attenuation/amplification and the prior art of different compression methods, may be illustrated in the Loudness versus Amplification plane. The prior art Loudness compression of speech may be approximated by the slanted line 111a, where incoming speech is amplified by a gradually decreasing amount; in the illustrated example the amplification at 30 db is by a factor 2, while the amplification at 80 dB is by 0.5, (an attenuation of 2).

Our method opts for neither amplifying nor attenuating incoming speech within a loudness band 110 around the "Comfortable" level 104, from 109dt to 109ut. The reasoning behind this strategy is that the experimentally determined "Comfortable" level already incorporates the desired optimal loudness and the relative compensation for the hearing loss measured in the "threshold of hearing" 76. The width of this band is of the order of 10-15 dB as the experimental assessment of the "Comfortable" level has an error range of ±5-7 dB. All sound signals above the upper threshold 109ut of the "Comfortable" level are attenuated downward 111b, in this example by a ratio of (1/3) and an aggressive attack level of 5 db/ms. Slightly above the threshold level, the amplification is changed to (1) 111*d* with a slow release rate, in order to prevent discontinuities.

In the loudness ranges below the lower threshold 109*dt* the signals are amplified, in this example by a factor of (2) 111*c* also at an aggressive rate, of 5 dB/ms. In this case, at the approach of the lower threshold, the amplification is reduced to (1) 111*d* also with a slow release rate, in order to prevent discontinuities. These changes of amplification may be programmed in a FIR or IIR filter placed after the amplifier.

FIG. 15 illustrates a linear combination of 3 equalizer channels, 147*a*, 147*b* and 147*c*, each comprising 8 frequency bands, in order to form a hearing aid of 24 bands from 20 Hz to 12 kHz; their outputs after passing through a PWM 142 are fed to a speaker 123. The signals detected by the digital microphone 96 include in addition to incoming speech also wideband "Noise". The noise interspersed between syllables and words is identified from incoming sound, by integrating the 96 kHz sampled signal with a Hamming or similar window approximately 10 msec wide and continually measuring the moving dynamic range of the signal 145. As speech volume is in general louder than noise, the dynamic range between lowest and highest signals changes continually 146. A dynamic comparator 146*a* set over the lower 10%, for example, of the dynamic range will eliminate the noise interspersed between phonemes, syllables and words. This noise reduction strategy is in addition to improving the S/N of the Speech signals achieved by adding the properly delayed signals between the microphones 795 placed in the front and back of the eyeglasses bows, explained above. The base volume of the frequency bands are set to represent the "Comfortable" level of loudness of the person wearing the device. The filter controller 146 adjusts the programmable filters' parameters according to the specific volume of the incoming sound in the frequency domain. The programmable filters 143*a*, 143*b* and 143*c* define the respective thresholds 110*a*, 110*b*, 110*c* in the low, middle and high frequency ranges and the different attack and release rates in these bands, according to the incoming sound volume in the frequency domain. At low frequencies (large wavelengths) the attack and release time constants are relatively long in respect to syllable durations, while at short wavelengths (high frequencies) the attack and release time constants may be relatively fast.

The attenuation/amplification regime is dependent on the reduced range of loudness of the hearing impaired person. The programmable IIR filters I, II and III prescribe constant amplification of low amplitude signals up to the low threshold 109*dt*, constant attenuation at high amplitude signal down to the high threshold 109*ut*, across the specific frequency bandwidths of the 3 frequency segments. At the middle loudness levels, within bands 110*a*, 110*b* and 110*c* around the "Comfortable" level, incoming sounds are neither amplified nor attenuated, based on the fact that the "comfortable" loudness already incorporates the amount of amplification required taking in account the "recruitment" of the hearing loss.

FIG. 15*a* illustrates a third method of bringing speech signals to the vicinity of the "Comfortable equal hearing loudness level" which is the optimal hearing loudness that takes into account the recruitment of the hearing loss. The "prior art" hearing correction consists in amplifying the incoming speech signals by diminishing factors with increasing amplitudes. The model illustrated in this figure consists in bringing loud and faint words to the "Comfortable" loudness level, without compressing or amplifying their amplitudes and changing their dynamic range.

Incoming speech detected by the microphone 184 is sampled with a Hamming or similar window 185 that integrates the stream with a time constant of the order of milliseconds; squaring the amplitude of the signal translates it to the intensity mode. A proper comparator eliminates low amplitude noise 186 and the Intensity scale is translated into a logarithmic scale and denoted in Sound Pressure Level units dB (SPL). At this stage the incoming voice is stored 192 for a short time length needed to determine the loudness of the signal to be forwarded to the receiver.

The detected Loudness 170, 175, 178 is not continuous, but interspersed with silence periods. The Loudness range 187 of incoming voice $\Delta L(t) = (L_{HIGH} - L_{LOW})_{(t)}$ may continuously be monitored as function of time, and the dynamic range of the Loudness 187 may be calculated periodically, for example between silence periods $t_0$, $t_1$, $t_2$. As our purpose is to identify words separated by silence periods, and as words also contain short silence periods between syllables and phonemes, we separate 830 the short silence periods within words, from long silence periods between words, by their length. In the illustrated example silence periods longer than 50 milliseconds 188 are defined as silence periods between words, and the time periods $(t_1-t_0)$, $(t_2-t_1)$ and $(t_3-t_2)$ are the time periods in which words are located. In each of these time periods between silence periods, the loudness range is measured and its average loudness recorded 189. If the average loudness is within ±X dB (for example ±10 dB) from the "Comfortable Hearing Loudness" level 174 no action is taken. However if the average loudness of the voice $\Delta L_{C1} = \Delta L t_0 - L_C$ (171, 172, 173 respectively) during $(t_1-t_0)$, $\Delta L_{C2} = \Delta L_{t1} - L_C$ (176, 177, 173 respectively) during $(t_2-t_1)$ and $\Delta L_{C3} = L_C - \Delta L_{t2}$ (180, 173 and 179 respectively), during $(t_3-t_2)$, are larger or smaller than ±X dB 190 from the loudness of the "Comfortable Hearing loudness level" 174 then a corrective action is taken. The corrective action consists in increasing or decreasing 193 the loudness of the voice loudness in the period that its loudness didn't change by more than ±X dB, by an amount equal to the distance D 191 of its average loudness from the "Comfortable Hearing loudness" level. In the illustrated example the corrective actions is reducing the loudness of the voice 170*a* and 175*a* in the $(t_1-t_0)$, $(t_2-t_1)$ periods by $\Delta L_{C1}$ and $\Delta L_{C2}$ respectively, and in the $(t_3-t_2)$, period adding to the voice 178*a* loudness of $\Delta L_{C3}$ 193 in order to bring their average loudness to the "Comfortable Hearing loudness" level. The volume modified words are then released for further processing 194 and relayed to the speaker 195.

FIG. 16 illustrates the use of a 3D accelerometer embedded on the eyeglasses bows as a potentiometer for setting the Audio amplification of the hearing eyeglasses.

A 3D accelerometer can sense acceleration in both directions in 3D. Consequently "Tapping" on it from two opposite directions (+X and −X; +Y and −Y; +Z and −Z)) can be differentiated, enabling the initiation of 6 different processes. As the response time of a MEMS accelerometer is of the order of milliseconds, the device may detect a series of consecutive Taps, double, triple or n-Taps thus enabling to detect complex "Tap" generated commands, for each of the processes. For example a single tap at the bottom (X-direction) of the hearing module 125*a* attached to the end of the hearing eyeglasses, may activate the speaker by supplying it power from the battery, while 2 consecutive taps within 50 milliseconds will deactivate the power and shut the amplifier. Similarly, a single tap on the top (Y-direction) of the hearing module, will increase the volume, while two taps will decrease it.

The accelerometer used as a "Tap" sensor, may be used to enter onto the Equalizer the amplification or attenuation factors that bring the loudness of the different bands close to the "Comfortable" level 104 as explained above in conjunction with FIG. 15. As illustrated in table 2 126, one or more "taps" will activate certain functions.

Table 3 126a illustrates additional functions that may be executed by the 3D accelerometer 125b by defining sequences of "Taps". Entering the amplification factors in 2 digit (nm) decibels on the equalizer may be executed serially on the consecutive frequency bands. The first digit of the 2 digit amplification factor may be entered by "Taping" under the accelerometer in the (−Y) direction, (2-taps) for the digit (1) and "n" times (2-taps) for the digit "n". The second digit (m) of the 2-digit amplification factor may be entered by "Taping" under the accelerometer, "m" single "Taps" apart, consecutively. An agreed upon delay, say of 1 second, may signal "moving" to setting the following frequency band.

In fact a Morse Code like "Taping" convention, of Single-Taps and Double-Taps, may be established to transmit complex strings of Letters, Numbers and Signs, to electronic transmission circuits, using the 3D accelerometer.

FIG. 17 illustrates the structure of a speaker 130 with a wideband frequency response suitable for use in hearing-aids and hearing earphones. The speaker is a modification of a voice coil 135c cone speaker, oscillating when attracted or repelled by a magnet 135b; it is built as a combination of Helmholtz cavities 137 with open bottoms that "close" when the moving diaphragm 135 reaches the bottom of the cavities 135a. During most of the time the air within the speaker cells are free to move; during the back travel of the diaphragm 135 air enters the speaker through the cell necks 134 and exit through the venting holes 135c. During the forth travel of the diaphragm, most of the time, the air may circulate between the cells and the sound produced depends on the interaction between the vibrating diaphragm and the internal complex geometry of the cell-walls. However when the diaphragm reaches the bottom of the Helmholz cells 135a and stuck to it for some time, the frequencies favored by the resonances of the Helmholtz resonators will be favored and preferentially amplified The resonant frequency of a Helmholz resonator is given by $f=(c/2\pi)(A/VL)^{1/2}$ where c is the speed of sound in the air (340 m/sec), V is the volume of the Helmholz cell 136, A 132 is the area of the cell's neck and L 133 is the length of the neck. The volume behind the micro-speaker is divided by two circular plates of 3 mm and 2 mm radii and depth of 3 mm, subdivided by 6 and 3 radial walls respectively. These walls form 6 cavities of 25.1 mm$^3$, 3 cavities of 15.7 mm$^3$ and one central cavity 37.7 mm$^3$, with open bottoms that close part of the time, by the vibrating elastomer diaphragm 135a. With a length of 5 mm of the neck above the holes, the resonant frequencies of the 6 peripheral cavities are 10.8 kHz, of the 3 middle cavities, 8.6 kHz and that of the central cavity 5.5 kHz. Such a geometry enhances the sound output at high frequencies.

The outputs of the Helmholz resonator cells may be connected to a multiplicity of flexible tubes 139 fitting the necks of the resonators; the tubes have decreasing cross-sections and gradually merge into one flexible tube 141 that can be inserted into the ear-canal. All other factors being equal, the tubes connected to the necks of the resonators, extend the bandwidth of the sound generated by the loudspeaker in the lower frequencies as the resonant frequency decreases with ($L^{1/2}$). FIG. 17 also illustrates a voice coil speaker where the space under the top cover is divided into Helmholtz cavities. The Q factor of the resonant cavities will change over time 143a, 143b, 143c, 143d, 143e, as the moving diaphragm moves to momentarily close the cavities. The closure period of the cavities 144 may be changed by structuring the shape, size and materials of their open ends 144a, 144b and consequently also changing the relative contributions of the different cavities, to the total sound volume.

The diaphragm of the speaker may also be selected to be active, (a piezoelectric bimorph for example 146) so that in addition to its movement forth and back like an inert diaphragm, it may also generate desired frequencies in resonance with the resonant cavities 145.

The proper combination of a piezoelectric diaphragm 146, suitably shaped Helmholtz cavities 145 and extension tubes 139 of the cavity necks, enables to tailor the frequency bandwidth desired for the particular positioning of the sound transducer, whether in free air, in an earphone plugged into the ear canal or in a behind-the-ear hearing aid, where the sound is conducted to the ear canal through a thin tube 141.

FIG. 18 illustrates a speaker that emits planar sound waves 160 by having its segmented 915 diaphragm 153 move forth and back in unison while the different segments of the diaphragm 152 may vibrate at different frequencies. The vibrating diaphragm is in contact with the open bottoms of the Helmholtz cavities 150 although free to move. The sounds produced by the vibrating segments 152 of the diaphragm 153 are selectively amplified by resonant Helmholtz cells 150. The diaphragm is made of a thin flexible elastomer on which are glued or deposited a series of flat spiral shaped coils 151. Adjacent flat spiral coils are wound in opposite directions and may be continuous or separate. Behind each of the coils is a stationary flat magnet 154 glued to a non-magnetic back structure 154a. Adjacent magnets have their north and south poles flipped in opposite directions so that the coils facing them are either attracted or repealed in unison, depending on the direction of the current in the coil. This geometry causes the flat diaphragm 153 to move up and down in unison and generate a plane sound wave 160.

The electrical signal responsible for generating the sound of the speaker may be fed to the first coil 151 and transferred from one coil to the next wound in the opposite direction.

However the electrical signal may also be transmitted in parallel 156a to the set of coils thus allowing more flexibility in shaping the sound wave generated by each coil-magnet pair. The original electrical signal 156 is first passed through an equalizer 155 that decomposes it into its frequency bands; each of the frequency band signal may be amplified separately 155a by different amounts and fed to the coils 151 independently and phase locked. In such an architecture the parts of the diaphragm glued to the coils will vibrate at different frequencies and at different amplitudes enabling to better shape the bandwidth uniformity. If the different segments of the diaphragm are in close proximity to the open 935 bottoms of Helmholz cavities 150 of different dimensions 150a, said Helmholtz cavities will preferentially emit sound waves of frequencies determined by their dimensions. However if the frequency of the signal fed to the flat coil coincides with the resonant frequency of the Helmholz cavity, the sound emitted through the neck of said Helmholtz cavity will be reinforced. As the sound inside the cavity is generated by the bottom plate 152 moving forth and back, said waves will be planar 940 waves and the sound exiting the neck 157 of the cavity will substantially be plane waves 160a and be more directional than sound waves generated by cone shaped diaphragms. Speakers generating substantially plane waves are superior to speakers that generate spherical waves, as their loudness at a distance is higher; as the spherical wave will disperse by $R^2$ at a distance (R) a plane wave may disperse only by 20%. The difference between plane wave emitting speakers and spherical wave emitting ones grows with distance.

Stand-alone Helmholtz cavities of varying neck sizes, having bottoms in the form of flat coils 158 deposited or glued to an elastomer back 159, in close proximity to flat magnets 154 may be built where the frequency of the coil and its vibration amplitude may be controlled through an equalizer. Such stand-alone "Helmholtz cubes" will generate sound waves whose bandwidth, intensity and direction 950 are controllable.

Figure 19:
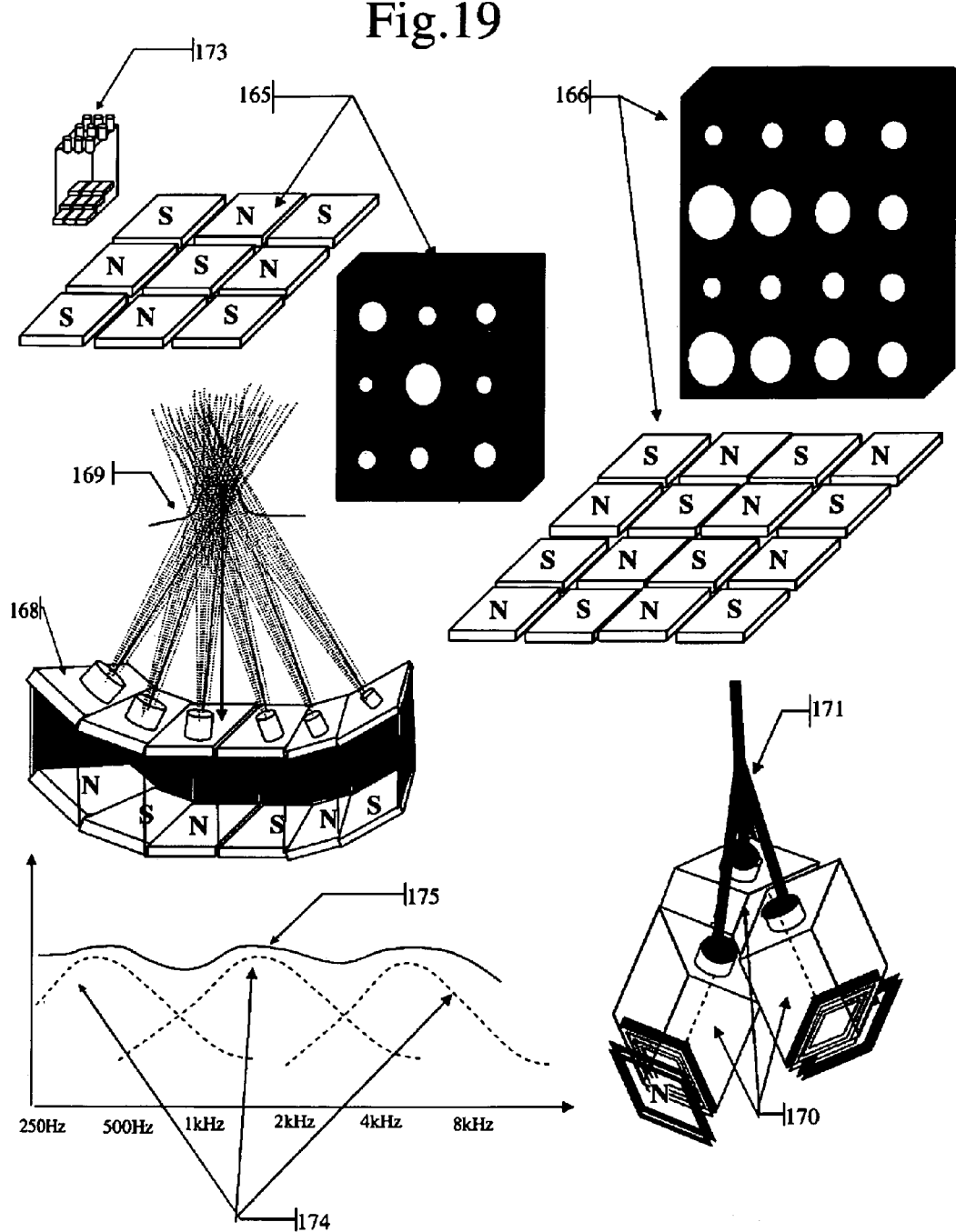
FIG. 19 illustrates square shaped loudspeakers formed by joining cubes of Helmholz resonators, where each cavity is tuned to a different frequency band and together cover a wideband of audio frequencies.

FIG. 19 illustrates loudspeakers of different sizes and shapes formed by joining "Helmholz cubes" of cavities with different sizes and lengths of necks, backed by arrays of flat magnets 165, 166. Each cavity may be tuned to a different frequency band, at different intensity and different direction 168, 170; together they may cover a wideband of audio frequencies and different directional capabilities. For example a 3×3 array of 2 mm×2 mm×6 mm "Helmholtz cubes" 173 constitutes a 6 mm×6 mm wideband receiver whose bandwidth may be tailored at 9 frequency bands. Similarly, the outputs of 3 "Helmholtz cubes" 170 tuned to low, middle and high frequencies 174 may be combined by thin tubes 171 attached to their necks, resulting in a smooth 175 wideband speaker. The stand-alone "Helmholtz cubes" may be positioned in mutually different directions so that the emitted sound beams 169a may substantially "converge" at a focal area 169 where the sound loudness increases. For example the dispersing beams of 6 Helmholtz cavities positioned on a 60° arc, where each cavity is tuned to a different frequency (i.e 250 Hz, 500 Hz, 1 kHz, 2 kHz, 4 kHz and 6 kHz), will converge to a relatively wide focal area, where the loudness is higher than the surroundings and the combined wideband makes speech intelligible, while outside this area speech is non-intelligible. In a different application 3 Helmholtz cavities 170 tuned to low, middle and high frequencies respectively 174 will produce a flat frequency response when their outputs are combined by 3 merging tubes 171.

There are multiple ways to realize the invention explained above, combine the differentiating features illustrated in the accompanying figures, and devise new embodiments of the method described, without departing from the scope and spirit of the present invention. Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

I claim:

1. A system comprising one or more communication servers and communication devices that collectively implement a social networking environment with enhanced voice communications for hearing challenged members of the network wherein,
   one or more of the computer servers host and maintain the website of the social network wherein, said system also comprises an internet service provider and wherein,
   the user communication devices, communicate with each other, directly or indirectly, using at least one of the communication servers and wherein,
   said communication server hosts a database of standard voice codes wherein, said voice codes describe the voice intonation loudness of a person during a normal telephony call and his comfortable hearing loudness level, both in the frequency domain, wherein,
   one or more standard descriptions have a one-to-many correspondence with member hearing and voice intonation profiles wherein,
   the same voice code may be assigned to a multiplicity of people and, a hearing correction application including an algorithm for changing the loudness in the frequency domain, of incoming and outgoing voice calls, based on said voice codes.

2. A system as in claim 1 for estimating the number of different comfortable hearing loudness level functions in the frequency domain of 250 Hz to 8 kHz and loudness range of 30 dB to 70 dB, based on the shape of perceived loudness curves and range of the perceived loudness of the comfortable hearing loudness level of 30 phon to 60 phon wherein,
   different means functions that are separated by no more than 10 dB in the 30 dB to 100 dB loudness range and by no more than an octave in the 250 Hz to 8 kHz frequency domain wherein,
   the shape of perceived loudness curves reflect a shape of the hearing loss of said person in the frequency domain with loss at low and high frequencies and the recruitment effect that diminishes the needed compensation for the degree of hearing loss at the comfortable hearing loudness level.

3. A voice communication network as in claim 1 where the comfortable hearing loudness level and the voice intonation loudness characteristics of said person in the frequency domain are measured, comprising a computerized device and an audio spectrum analyzer wherein,
   the computerized device generates a prerecorded list of tones at ascending loudness levels in 10 db steps, and tones at descending loudness levels shifted by 5 db and then at 0 dB steps wherein,
   the user classifies the loudness of heard tones subjectively in terms of soft, comfortable and loud, wherein,
   the computerized device determines the comfortable hearing loudness level in dB units in the frequency domain, as the weighted average loudness of tones elected by the respondent as comfortable, and wherein,
   the voice intonation loudness in the frequency domain of said user, is then measured by asking him to articulate several phrases at the loudness level he normally talks on the phone and,
   the audio spectrum analyzer measures the loudness distribution in the frequency domain wherein,
   the user's measured comfortable loudness level $L_A$ and voice intonation loudness characteristics $V_A$ are automatically compared with the lists of the predefined comfortable hearing loudness level and voice intonation characteristic levels and,
   the closest predefined characteristics, in the sense that the distances, $D_L$, and $D_V$ in SPL dB units, in the frequency domain, between the measured (m) and predefined (p) characteristics defined as; $D_L = \Sigma_f (L_A)_m - (L_A)_p$; $D_V = \Sigma_f (V_A)_m - (V_A)_p$ are less than $[N_f]5$ dB, where $N_f$ is the number of frequencies, are assigned to the user, wherein,
   the measured characteristics are added to the aggregate of the predefined comfortable hearing loudness and voice intonation loudness levels and new voice codes issued if the measured characteristics are not close to any of the predefined ones, in the sense that the distances $D_L$ and $D_V$ are larger than [$N_f$]5 dB and,
a voice code based on predefined comfortable loudness level and voice intonation loudness characteristics are assigned to the user.

4. A system as in claim 1 using a hearing correction algorithm wherein the optimal loudness of incoming and outgoing calls as a function of frequency, are based on the call receiving party's comfortable hearing loudness level as a function of frequency ($L_{CS}$), modified by the caller's voice intonation loudness ($V_S$) as a function of frequency, as $(1/S)V_S[\Sigma_S(V_S/L_{CS})]$, wherein
voice intonation loudness $V_S$ is in perceived loudness phon units.

5. A system as in claim 1, comprising a hearing correction algorithm wherein the loudness of incoming calls are brought selectively to the loudness vicinity of the comfortable hearing loudness level of the called party, depending on their initial loudness in respect to the loudness of the comfortable hearing loudness level wherein,
The incoming voice signal is stored for a time period equal to the duration of a word measured as the time period between two consecutive silence periods longer than pauses between phonemes and wherein,
the stored signal's loudness is converted into perceived loudness in phon units and, the stored signal's loudness in phon units is compared to the loudness of the comfortable hearing loudness, in units of phon and,
if the perceived average loudness of the incoming call's signal is within a band of ±10 dB in respect to the comfortable hearing loudness level, the signal is released to proceed to the next stage of processing and,
if the average loudness of the incoming call stored between the two silence periods is less than or greater than 10 dB with respect to said comfortable hearing loudness level, then the signal's loudness is augmented or decreased respectively by an amount needed to bring its average loudness to the comfortable hearing loudness level of the called party.

6. A system as in claim 1 wherein the loudness of incoming calls are brought to the vicinity of the comfortable hearing loudness level of the called party, wherein
vicinity is defined as ±10 db, depending on their initial loudness in respect to the loudness of the said comfortable hearing loudness level wherein,
the loudness of incoming calls are converted in real time into perceived loudness in phon units and,
said perceived loudness of incoming calls is compared in real time, with that of 100 the comfortable hearing loudness level, in units of phon and,
if the perceived loudness of the incoming call's signal is within a band of +10 dB in respect to said comfortable hearing loudness level, the signal is released to proceed to the next stage of processing and,
if the loudness of the incoming call's signal is less than the 10 dB 105 with respect to said comfortable hearing loudness level, then the signal is amplified by a fixed factor that brings its average loudness to the Comfortable Hearing loudness level −10 dB and,
if the loudness of the incoming call's signal is larger than 10 dB or more with respect to said comfortable hearing loudness level, then the signal is attenuated by a fixed factor that brings its average loudness to the Comfortable Hearing loudness level +10 dB.

7. A communication telephony server as in claim 1 hosting a hearing correction application and,
communication devices of said members hereinafter denoted by the subscript (i) possessing the capability of further adjusting the loudness of incoming calls in the frequency domain, in addition to the hearing correction algorithm implemented on the incoming call in the communications server wherein,
said communication devices also store said member's comfortable hearing loudness profile and,
a list of voice intonation characteristics of frequent callers that do not modify the loudness in the frequency domain of their calls, in view of the call recipient's impaired hearing profile, wherein,
such frequent callers are identified by their "Caller ID" and,
a list of frequently called non-member's comfortable hearing loudness profiles that do not correct the loudness of their incoming calls, wherein,
any incoming call from a non-member (j) having a loudness $(V_S)_j$ in the frequency domain is first translated into Phon units and then modified by multiplying it by $1/S\Sigma_S(V_S/L_{CS})_i$ thus bringing it to the vicinity of the call recipient's comfortable hearing loudness level $(L_{CS})_i$ and,
outgoing calls, to people that do not have the hearing correction application that adapts the loudness of the incoming call to their communication device, are modified by multiplying their loudness $(V_S)_i$ in the frequency domain, by $(1/S)\Sigma_S(V_S/L_{CS})]$ if the "comfortable hearing loudness" level $(L_{CS})_j$ of the called party is known, thus modifying the loudness of the outgoing call to a level close to the called party's comfortable hearing loudness" level $(L_{CS})_j$.

8. A communication server as in claim 1 hosting a bank of hardware audio equalizers, a database of voice codes, and hearing correction algorithms wherein,
the frequency bands of said equalizers are set to cover the bandwidth of the voice codes and the hearing correction algorithms, wherein,
the minimal number of equalizers needed to handle in parallel any hearing correction for the duration of a call between parties having different identifiers is twice the number of hearing profiles ($H_p$) multiplied by the number of voice intonation profiles ($V_p$) by the number of 'ears' to be hearing corrected ($E_e$) and,
the number of equalizers needed to handle in parallel any hearing correction for one of the ears, applying one correction algorithm, is a multiple M of the number $2(H_pV_p)$ wherein,
$M[2(H_pV_p)]=(N)(\Delta T)$ where (N) is the number of subscribers and $\Delta T$ is the average duration of a voice call.

9. A wireless communication system as in claim 1 based on a network of short range transceivers, comprising bluetooth transceivers, for implementing a hearing correction method consisting in bringing the loudness level of voices heard, to the comfortable hearing loudness level of the hearing person wherein,
said transceivers connect specialized communication devices comprising: PSTN phones, cellular phones, tablets, hearing eyeglasses, cellular hand-watches, hearing earphones, hearing aids, and hearing earrings which together act as a 'distributed hearing aid system' wherein, said specialized communication devices collectively store databases of voice codes of the users of the network and electronic equalizer circuits for modifying the loudness of sound frequencies, based on said voice codes.

10. A wireless communication system as in claim 9 wherein the specialized communication devices have access to a display showing the face of the calling party, wherein, said display enables to focus on parts of the face around the mouth for facilitating lip-reading and, a speech-to-text application initiated by the calling or called party showing below the displayed mouth of the talker the text of the articulated speech in the form of subtitles on both party's displays while talking and, a dictionary application, that upon clicking on one of the words displayed by the speech-to-text application, displays on an overlaying window the definition of said word and, audio equalizers for implementing the Hearing Correction application on incoming and outgoing calls for the left and right ears separately.

11. A wireless communication system as in claim 1 serving a social network of hearing challenged members of the network wherein, said network offers on-line hearing related services comprising hearing tests, computerized hearing impairment diagnosis, hearing improvement lessons, comparison of hearing-aid models including hearing eyeglasses and hearing earrings, recording of voice intonation characteristics of callers, use of cell-phones and tablets for lip-reading, and buying prescription drugs and wherein, said network provides video-conferencing services enabling the members to exchange specific hearing related experiences, training to perform hearing-aid tuning and "virtual fitting" of the hearing aids.

* * * * *